US012675109B2

(12) United States Patent
Pedersen et al.

(10) Patent No.: US 12,675,109 B2
(45) Date of Patent: Jul. 7, 2026

(54) DISPLAYING AN OVERLAY INCLUDING A PROJECTED PATH OF A VEHICLE

(71) Applicant: Nissan North America, Inc., Franklin, TN (US)

(72) Inventors: Liam Pedersen, San Francisco, CA (US); Viju James, Fremont, CA (US); Mark Fischer, Santa Rosa, CA (US); D M Raisul Ahsan, San Francisco, CA (US)

(73) Assignee: Nissan North America, Inc., Franklin, TN (US)

( * ) Notice: Subject to any disclaimer, the term of this patent is extended or adjusted under 35 U.S.C. 154(b) by 138 days.

(21) Appl. No.: 18/194,333

(22) Filed: Mar. 31, 2023

(65) Prior Publication Data

US 2024/0329633 A1 Oct. 3, 2024

(51) Int. Cl.
| | |
|---|---|
| *G06V 10/75* | (2022.01) |
| *G05D 1/00* | (2006.01) |
| *G06V 20/56* | (2022.01) |

(52) U.S. Cl.
CPC ......... *G05D 1/0038* (2013.01); *G05D 1/0016* (2013.01); *G06V 10/751* (2022.01); *G06V 20/588* (2022.01)

(58) Field of Classification Search
None
See application file for complete search history.

(56) References Cited

U.S. PATENT DOCUMENTS

| | | | | |
|---|---|---|---|---|
| 5,155,683 | A | 10/1992 | Rahim | |
| 5,541,845 | A * | 7/1996 | Klein | ................... G01C 21/343 |
| | | | | 701/493 |
| 9,494,935 | B2 | 11/2016 | Okumura et al. | |

(Continued)

FOREIGN PATENT DOCUMENTS

| | | |
|---|---|---|
| CN | 108347436 A | 7/2018 |
| CN | 109345804 A | 2/2019 |

(Continued)

OTHER PUBLICATIONS

Stack overflow website: answer to question on how to send video file using JSON method, Retrieved from Internet URL—https://stackoverflow.com/questions/21168936/how-to-send-video-files-as-json-data-not-the-file-name-or-path-but-content-to, Retrieved on Jan. 4, 2025, 5 pages.

(Continued)

*Primary Examiner* — Peter D Nolan
*Assistant Examiner* — Matthew Cobb
(74) *Attorney, Agent, or Firm* — Young Basile Hanlon & MacFarlane, P.C.

(57) ABSTRACT

A system may receive a video stream from a camera of a vehicle in a transportation network. The system may also receive an input indicating a steering angle and/or a distance to travel. The system may determine a projected path of the vehicle in the transportation network based on the input. The projected path may be determined using spatial coordinates relative to the transportation network or the camera. The system may then determine, from the spatial coordinates, pixel coordinates in the video stream corresponding to the projected path. The system may display an overlay in the video stream based on the pixel coordinates. The overlay may include a visualization of the projected path.

20 Claims, 19 Drawing Sheets

(56) References Cited

U.S. PATENT DOCUMENTS

| | | | |
|---|---|---|---|
| 9,658,615 | B2 | 5/2017 | Pack et al. |
| 10,317,899 | B2 | 6/2019 | Liu et al. |
| 10,567,497 | B2 | 2/2020 | Charalambides et al. |
| 10,666,351 | B2 | 5/2020 | Ziskin |
| 10,965,728 | B2 | 3/2021 | Esmail et al. |
| 11,099,558 | B2 | 8/2021 | Huang et al. |
| 11,115,112 | B2 | 9/2021 | Christomanos |
| 11,390,301 | B2 | 7/2022 | Hari et al. |
| 11,688,079 | B2 | 6/2023 | Soon-Shiong |
| 11,912,301 | B1 | 2/2024 | Hendy et al. |
| 12,002,223 | B2 | 6/2024 | Soon-Shiong |
| 12,029,156 | B1 | 7/2024 | Simpson |
| 12,057,928 | B2 | 8/2024 | Duval et al. |
| 2006/0004512 | A1* | 1/2006 | Herbst ............... G06Q 30/0241 701/431 |
| 2007/0198144 | A1 | 8/2007 | Norris et al. |
| 2008/0165140 | A1* | 7/2008 | Christie ............. G06F 3/04883 345/173 |
| 2012/0191269 | A1 | 7/2012 | Chen et al. |
| 2015/0248131 | A1 | 9/2015 | Fairfield et al. |
| 2016/0323565 | A1 | 11/2016 | Van Baarsen et al. |
| 2016/0358475 | A1* | 12/2016 | Prokhorov .......... G05D 1/0088 |
| 2017/0285649 | A1* | 10/2017 | Debreczeni .......... G05D 1/0278 |
| 2018/0027265 | A1 | 1/2018 | Ziskin |
| 2018/0139585 | A1 | 5/2018 | Gholmieh et al. |
| 2018/0329413 | A1 | 11/2018 | Charalambides et al. |
| 2018/0329671 | A1 | 11/2018 | Einziger et al. |
| 2018/0342080 | A1* | 11/2018 | Maddern ............ G01C 21/3837 |
| 2019/0049968 | A1 | 2/2019 | Dean et al. |
| 2019/0286153 | A1 | 9/2019 | Rankawat et al. |
| 2019/0302761 | A1 | 10/2019 | Huang et al. |
| 2020/0041994 | A1 | 2/2020 | Alalao et al. |
| 2020/0128061 | A1 | 4/2020 | Esmail et al. |
| 2020/0177660 | A1 | 6/2020 | Connor et al. |
| 2020/0184809 | A1* | 6/2020 | Lee .................. G08G 1/096861 |
| 2020/0202644 | A1 | 6/2020 | Shi et al. |
| 2020/0269877 | A1 | 8/2020 | Mortazavi et al. |
| 2020/0349844 | A1 | 11/2020 | Rosenzweig et al. |
| 2020/0356097 | A1* | 11/2020 | Berkemeier ......... G05D 1/0212 |
| 2020/0368629 | A1 | 11/2020 | Moss |
| 2021/0018916 | A1 | 1/2021 | Thakur et al. |
| 2021/0031808 | A1 | 2/2021 | Nakagawa et al. |
| 2021/0191392 | A1 | 6/2021 | Talavera et al. |
| 2021/0223771 | A1 | 7/2021 | Whitney et al. |
| 2021/0240190 | A1 | 8/2021 | Wray et al. |
| 2021/0389769 | A1 | 12/2021 | Hari et al. |
| 2022/0126864 | A1 | 4/2022 | Moustafa et al. |
| 2022/0147042 | A1 | 5/2022 | Trank et al. |
| 2022/0185115 | A1 | 6/2022 | Divekar et al. |
| 2022/0194419 | A1 | 6/2022 | Houshmand et al. |
| 2022/0236741 | A1 | 7/2022 | Bridenbaugh et al. |
| 2022/0263722 | A1 | 8/2022 | Kodaypak et al. |
| 2022/0413483 | A1* | 12/2022 | Choi ................... G05D 1/0214 |
| 2023/0176573 | A1 | 6/2023 | Kumavat et al. |
| 2024/0142967 | A1 | 5/2024 | MacGregor et al. |
| 2024/0205274 | A1 | 6/2024 | Khalil et al. |
| 2024/0296570 | A1 | 9/2024 | Soon-Shiong |
| 2024/0310841 | A1* | 9/2024 | Samuels ............... G05D 1/222 |
| 2024/0430319 | A1 | 12/2024 | Allen et al. |
| 2025/0189965 | A1 | 6/2025 | Trank et al. |

FOREIGN PATENT DOCUMENTS

| | | | | |
|---|---|---|---|---|
| CN | 111512609 | A | 8/2020 | |
| CN | 110850865 | B * | 8/2022 | ............. H04W 4/40 |
| EP | 4462217 | A1 | 11/2024 | |
| WO | 2021002911 | A1 | 1/2021 | |
| WO | WO-2021194254 | A1 * | 9/2021 | ............ H04N 23/90 |
| WO | 2021233588 | A1 | 11/2021 | |
| WO | WO-2022147274 | A1 * | 7/2022 | ............ G06T 7/246 |
| WO | 2022234574 | A1 | 11/2022 | |

OTHER PUBLICATIONS

Cho et al., "Multimedia Sensor Dataset for the Analysis of Vehicle Movement", MMSys'17: Proceedings of the 8th ACM on Multimedia Systems Conference, Jun. 20, 2017, pp. 175-180.

Cho et al., "Multimedia Sensor Dataset for the Analysis of Vehicle Movement", ACM MMSys 2017, 17 pages.

"RTP Payload Format for H.264 Video Streams Extensions", Sep. 15, 2017, 32 pages.

Ericsson et al., RFC 8860 Sending Multiple Types of Media in a Single RTP Session; Internet Engineering Task Force; Standards Track; Jan. 2021, pp. 15.

* cited by examiner

14000

DISPLAYING AN OVERLAY INCLUDING A PROJECTED PATH OF A VEHICLE

TECHNICAL FIELD

This disclosure relates generally to autonomous vehicles, and more particularly to displaying an overlay including a projected path of a vehicle.

BACKGROUND

Autonomous vehicles (AVs) offer human drivers the convenience of efficient conveyance from one location to another without having to direct their attention to the state of the road. An AV can be defined as a self-driven (e.g., computer controlled) vehicle that is capable of driving on roadways while obeying traffic rules and norms. However, even the best autonomous vehicle programming cannot account for, and control, all conditions and situations that can arise during operation of the autonomous vehicle. Furthermore, there are times when the autonomous vehicle encounters conditions and situations that might benefit from the assistance of a human operator (e.g., a tele-operator).

SUMMARY

Disclosed herein are aspects, features, elements, implementations, and embodiments of displaying an overlay including a projected path of a vehicle.

An aspect of the disclosed embodiments is a method that may include receiving a video stream from a camera of a vehicle in a transportation network; receiving an input indicating at least one of a steering angle or a distance to travel; determining a projected path of the vehicle in the transportation network based on the input, wherein the projected path is determined using spatial coordinates relative to at least one of the transportation network or the camera; determining, from the spatial coordinates, pixel coordinates in the video stream corresponding to the projected path; and displaying an overlay in the video stream based on the pixel coordinates, the overlay including a visualization of the projected path.

Another aspect of the disclosed embodiments is an apparatus that may include a memory and a processor configured to execute instructions stored in the memory to receive a video stream from a vehicle in a transportation network; receive an input indicating a steering angle and a distance to travel; determine a projected path of the vehicle in the transportation network based on the steering angle and the distance to travel, wherein the projected path is determined using three dimensional (3D) spatial coordinates relative to the transportation network; determine, from the three dimensional spatial coordinates, two dimensional (2D) pixel coordinates in the video stream corresponding to the projected path; and display an overlay in the video stream based on the two dimensional pixel coordinates, the overlay including a visualization of the projected path.

Another aspect of the disclosed embodiments is a non-transitory computer readable medium storing instructions operable to cause one or more processors to perform operations including receiving a video stream from a camera implemented by a vehicle in a transportation network; receiving an input indicating at least one of a steering angle or a distance to travel; determining a projected path of the vehicle in the transportation network based on the input, wherein the projected path is determined using spatial coordinates relative to the camera; determining, from the spatial coordinates, pixel coordinates in the video stream corresponding to the projected path; and displaying an overlay in the video stream based on the pixel coordinates, the overlay including a visualization of the projected path.

Another aspect of the disclosed embodiments is a method that may include receiving a video stream from a camera of a vehicle in a transportation network; receiving an input indicating pixel coordinates in the video stream; displaying an overlay in the video stream based on the pixel coordinates, the overlay including a visualization of a projected path of the vehicle; determining, from the pixel coordinates, spatial coordinates of the projected path of the vehicle in the transportation network, wherein the spatial coordinates are relative to at least one of the transportation network or the camera; and transmitting information to the vehicle based on a selection of the overlay, the information configured to cause the vehicle to follow the projected path according to the spatial coordinates.

Another aspect of the disclosed embodiments is an apparatus that may include a memory and a processor configured to execute instructions stored in the memory to receive a video stream from a vehicle in a transportation network; receive an input indicating two dimensional pixel coordinates in the video stream; display an overlay in the video stream based on the two dimensional pixel coordinates, the overlay including a visualization of a projected path of the vehicle; determine, from the two dimensional pixel coordinates, three dimensional spatial coordinates of the projected path of the vehicle in the transportation network, wherein the three dimensional spatial coordinates are relative to the transportation network; and transmit information to the vehicle based on a selection of the overlay, the information configured to cause the vehicle to follow the projected path according to the three dimensional spatial coordinates.

Another aspect of the disclosed embodiments is a non-transitory computer readable medium storing instructions operable to cause one or more processors to perform operations including receiving a video stream from a camera implemented by a vehicle in a transportation network; receiving a first input indicating pixel coordinates in the video stream; displaying an overlay in the video stream based on the pixel coordinates, the overlay including a visualization of a projected path of the vehicle; receiving a second input indicating a selection of the overlay; determining, from the pixel coordinates, spatial coordinates of the projected path of the vehicle in the transportation network, wherein the spatial coordinates are relative to the camera; and transmitting information to the vehicle based on the selection, the information configured to cause the vehicle to follow the projected path according to the spatial coordinates.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings in which like reference numbers refer to like elements unless otherwise noted.

DETAILED DESCRIPTION

Figure 1:
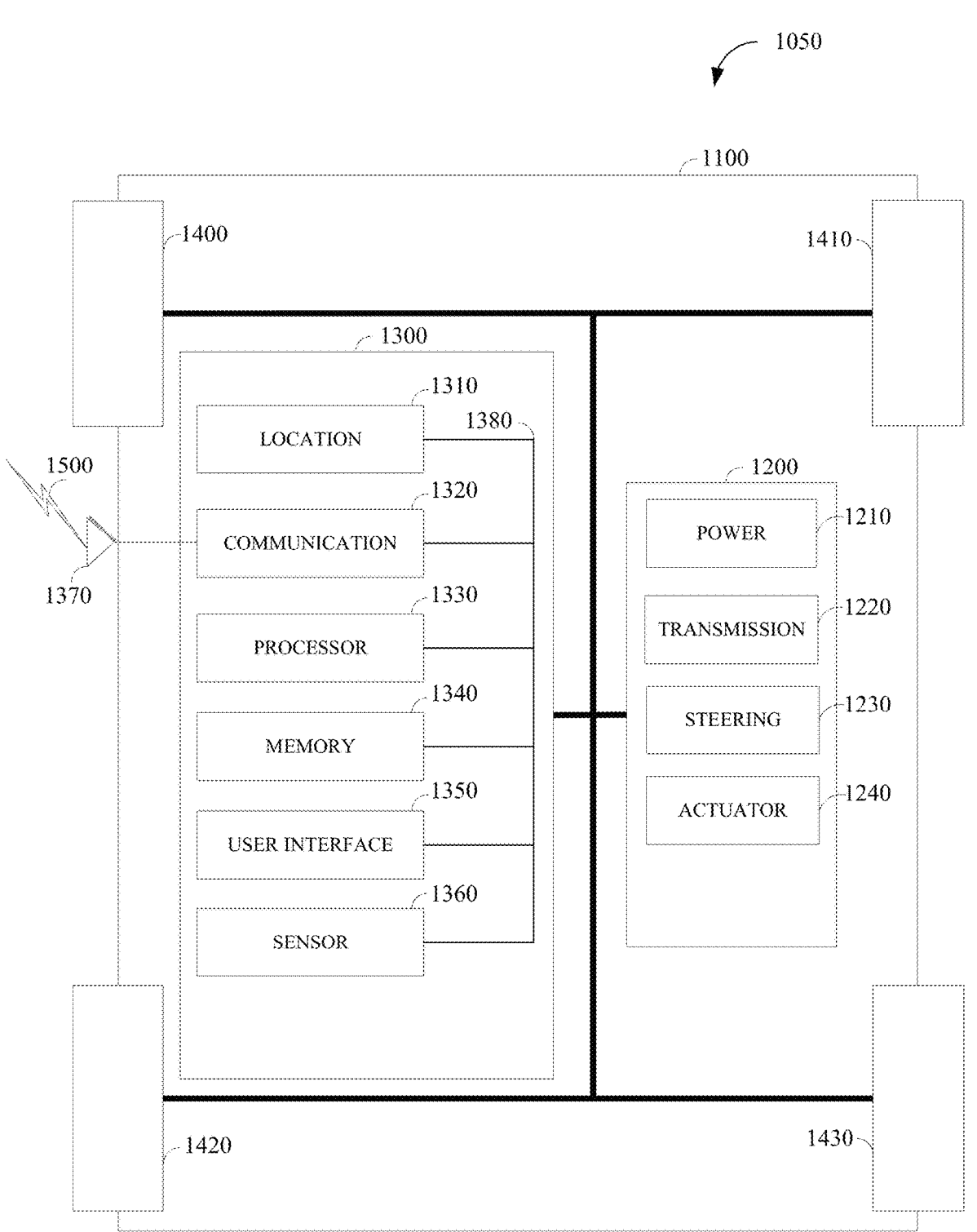
FIG. 1 is a diagram of an example of a portion of a vehicle in which the aspects, features, and elements disclosed herein may be implemented.

Teleoperation enables an autonomous vehicle (AV) to ensure safety during a trip, such as in situations where an artificial intelligence (AI) system of the AV is unable to determine an optimum course of action. For example, an AV may not be able to fully assess, classify, and/or understand the intentions of other road users. The other road users can include pedestrians, construction workers, policemen, construction equipment, vehicles, cyclists, or other static objects (e.g., buildings, road signs, etc.). For example, assessing the road situation may be outside the sensing capabilities of the AV, such as in the case of identifying whether other road users are present around a corner that is obstructed by a building or whether other road users are present on the other side of a hill. Furthermore, resolving some situations (e.g., obstruction situations) may require the AV to deviate from the normal (e.g., legal, socially acceptable) rules of driving in a manner that is unacceptable without human oversight.

Teleoperation may be enabled by allowing a tele-operator to remotely navigate a vehicle by utilizing a video stream of the environment in front and around the vehicle. However, in some cases, it may be time consuming for the tele-operator to generate a path for the vehicle. For example, the tele-operator may need to determine multiple waypoints on a map to establish the path, then transmit the path to the vehicle. Depending on the complexity of the situation, the time involved to create the path may cause an unreasonable delay for the vehicle to make progress. As a result, unless, the video stream has a low latency, the teleoperation may be ineffective. Further, since the tele-operator is not physically located inside the vehicle, it may be difficult for the tele-operator to visualize the driving situation.

Implementations of this disclosure address problems such as these by displaying an overlay in a video stream in graphical user interface (GUI) to improve teleoperation of a vehicle. In some implementations, a system can receive the video stream from a camera of the vehicle in the transportation network. The system can also receive an input indicating a steering angle and/or a distance to travel. The system can determine a projected path of the vehicle in the transportation network based on the input. The projected path can be determined using spatial coordinates relative to the transportation network (e.g., world coordinates) or the camera (e.g., camera coordinates). The system can determine, from the spatial coordinates, pixel coordinates in the video stream corresponding to the projected path. The system can display an overlay in the video stream based on the pixel coordinates. The overlay can include a visualization of the projected path. In some implementations, the system can generate the overlay to assist a tele-operator. The overlay of the projected path may be drawn on the video stream received from the front camera of the car. The overlay may enable the tele-operator to visualize a path that the vehicle will travel given a distance and/or steering angle, so that action can be taken, for example, to avoid an obstruction along the path.

In some cases, a GUI for teleoperation can be displayed through a web interface. A tele-operator can hover on a virtual steering wheel in the GUI to visualize a projected path on the video stream. The tele-operator can set a distance to travel utilizing a distance slider in the GUI or a mouse wheel. When the tele-operator is satisfied with the projected path, the tele-operator can select the values of these parameters (e.g., by clicking on the virtual steering wheel) for the system to maneuver the vehicle. The system can implement a pathfinding component, a transformation component, and a drawing component. The pathfinding component can take the distance and the wheel angle as input and utilize the Ackermann model (e.g., Ackermann steering geometry) to determine the radius of the path curve. The pathfinding component can then utilize trigonometric and geometric calculations to determine three dimensional world coordinates of the projected path as output. The transformation component can take the three dimensional world coordinates determined by the pathfinding component, along with intrinsic parameters of the front camera being used to generate the video stream. The transformation component can convert the three dimensional world coordinates into two dimensional pixel coordinates in the GUI, such as a HyperText Markup Language (HTML) canvas. The drawing component can then utilize spline interpolation to draw a smooth curve representing the projected path on the video stream.

Some implementations may include a system receiving a video stream from a camera of a vehicle in a transportation network. The system can receive an input indicating pixel coordinates in the video stream. The system can display an overlay in the video stream based on the pixel coordinates. The overlay can include a visualization of a projected path of the vehicle. The system can determine, from the pixel coordinates, spatial coordinates of the projected path of the vehicle in the transportation network. The spatial coordinates can be relative to the transportation network (e.g., the world coordinates) or the camera (e.g., the camera coordinates). The system can transmit information to the vehicle based on a selection of the overlay. The information can be configured to cause the vehicle to follow the projected path according to the spatial coordinates. In some implementations, a tele-operator can point a mouse directly on the video stream where the tele-operator wants the vehicle to move to and click. This can cause the system to generate a path starting from the current position of the vehicle to the clicked position. This may enable faster teleoperation. The tele-operator can click again on the screen while the vehicle is moving. This can cause the system to correct the previously sent path. This can also enable smoother motion for the vehicle by reducing stop and go. By clicking on the screen, the clicked position is taken from the screen coordinates, and then converted to camera coordinates and then to the world coordinates. The point is then used to generate the future path of the vehicle.

In some cases, the system can track mouse movement and clicks on a video panel or GUI. As the mouse is moved in the GUI, the system can determine if a path can be generated to that particular point with a fixed curvature from a current position of the vehicle. If a path can be generated, then the system can generate an overlay representing the possible path. If the mouse is on top of a point where a path cannot be generated, then the system will not display an overlay. If the tele-operator clicks on a valid point, then a path is generated corresponding to the overlay and transmitted to the vehicle. The vehicle can then start moving and following the path. The path that the vehicle follows can be sent back to the GUI of the system and displayed, for example, as green lines corresponding to the motion.

To describe some implementations in greater detail, reference is made to the following figures.

FIG. 1 is a diagram of an example of a vehicle 1050 in which the aspects, features, and elements disclosed herein may be implemented. The vehicle 1050 may include a chassis 1100, a powertrain 1200, a controller 1300, wheels 1400/1410/1420/1430, or any other element or combination of elements of a vehicle. Although the vehicle 1050 is shown as including four wheels 1400/1410/1420/1430 for simplicity, any other propulsion device or devices, such as a propeller or tread, may be used. In FIG. 1, the lines interconnecting elements, such as the powertrain 1200, the controller 1300, and the wheels 1400/1410/1420/1430, indicate that information, such as data or control signals, power, such as electrical power or torque, or both information and power, may be communicated between the respective elements. For example, the controller 1300 may receive power from the powertrain 1200 and communicate with the powertrain 1200, the wheels 1400/1410/1420/1430, or both, to control the vehicle 1050, which can include accelerating, decelerating, steering, or otherwise controlling the vehicle 1050.

The powertrain 1200 includes a power source 1210, a transmission 1220, a steering unit 1230, a vehicle actuator 1240, or any other element or combination of elements of a powertrain, such as a suspension, a drive shaft, axles, or an exhaust system. Although shown separately, the wheels 1400/1410/1420/1430 may be included in the powertrain 1200.

The power source 1210 may be any device or combination of devices operative to provide energy, such as electrical energy, chemical energy, or thermal energy. For example, the power source 1210 includes an engine, such as an internal combustion engine, an electric motor, or a combination of an internal combustion engine and an electric motor, and is operative to provide energy as a motive force to one or more of the wheels 1400/1410/1420/1430. In some embodiments, the power source 1210 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 receives energy from the power source 1210 and transmits the energy to the wheels 1400/1410/1420/1430 to provide a motive force. The transmission 1220 may be controlled by the controller 1300, the vehicle actuator 1240 or both. The steering unit 1230 may be controlled by the controller 1300, the vehicle actuator 1240, or both and controls the wheels 1400/1410/1420/1430 to steer the vehicle. The vehicle actuator 1240 may receive signals from the controller 1300 and may actuate or control the power source 1210, the transmission 1220, the steering unit 1230, or any combination thereof to operate the vehicle 1050.

In some embodiments, the controller 1300 includes a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof can be integrated in one or more electronic units, circuits, or chips.

In some embodiments, the processor 1330 includes any device or combination of devices capable of manipulating or processing a signal or other information now existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor may be operatively coupled with the memory 1340 via a communication bus 1380.

In some embodiments, the processor 1330 may be configured to execute instructions including instructions for remote operation which may be used to operate the vehicle 1050 from a remote location including the operations center. The instructions for remote operation may be stored in the vehicle 1050 or received from an external source such as a traffic management center, or server computing devices, which may include cloud-based server computing devices. The processor 1330 may be configured to execute instructions for following a projected path as described herein.

The memory 1340 may include any tangible non-transitory computer-usable or computer-readable medium, capable of, for example, containing, storing, communicating, or transporting machine readable instructions or any information associated therewith, for use by or in connection with the processor 1330. The memory 1340 is, for example, one or more solid state drives, one or more memory cards, one or more removable media, one or more read only memories, one or more random access memories, one or more solid-state drives, one or more disks, including a hard disk, a floppy disk, an optical disk, a magnetic or optical card, or any type of non-transitory media suitable for storing electronic information, or any combination thereof.

The electronic communication interface 1370 may be a wireless antenna, as shown, a wired communication port, an optical communication port, or any other wired or wireless unit capable of interfacing with a wired or wireless electronic communication medium 1500.

The electronic communication unit 1320 may be configured to transmit or receive signals via the wired or wireless electronic communication medium 1500, such as via the electronic communication interface 1370. Although not explicitly shown in FIG. 1, the electronic communication unit 1320 is configured to transmit, receive, or both via any wired or wireless communication medium, such as radio frequency (RF), ultraviolet (UV), visible light, fiber optic, wire line, or a combination thereof. Although FIG. 1 shows a single one of the electronic communication unit 1320 and a single one of the electronic communication interface 1370, any number of communication units and any number of communication interfaces may be used. In some embodiments, the electronic communication unit 1320 can include a dedicated short-range communications (DSRC) unit, a wireless safety unit (WSU), IEEE 802.11p (Wifi-P), or a combination thereof.

The location unit 1310 may determine geolocation information, including but not limited to longitude, latitude, elevation, direction of travel, or speed, of the vehicle 1050. For example, the location unit includes a global positioning system (GPS) unit, such as a Wide Area Augmentation System (WAAS) enabled National Marine-Electronics Association (NMEA) unit, a radio triangulation unit, or a combination thereof. The location unit 1310 can be used to obtain information that represents, for example, a current heading of the vehicle 1050, a current position of the vehicle 1050 in two or three dimensions, a current angular orientation of the vehicle 1050, or a combination thereof.

The user interface 1350 may include any unit capable of being used as an interface by a person, including any of a virtual keypad, a physical keypad, a touchpad, a display, a touchscreen, a speaker, a microphone, a video camera, a sensor, and a printer. The user interface 1350 may be operatively coupled with the processor 1330, as shown, or with any other element of the controller 1300. Although shown as a single unit, the user interface 1350 can include one or more physical units. For example, the user interface 1350 includes an audio interface for performing audio communication with a person, and a touch display for performing visual and touch based communication with the person.

The sensor 1360 may include one or more sensors, such as an array of sensors, which may be operable to provide information that may be used to control the vehicle. The sensor 1360 can provide information regarding current operating characteristics of the vehicle or its surrounding. The sensors 1360 include, for example, a speed sensor, acceleration sensors, a steering angle sensor, traction-related sensors, braking-related sensors, or any sensor, or combination of sensors, that is operable to report information regarding some aspect of the current dynamic situation of the vehicle 1050.

In some embodiments, the sensor 1360 may include sensors that are operable to obtain information regarding the physical environment surrounding the vehicle 1050. For example, one or more sensors detect road geometry and obstacles, such as fixed obstacles, vehicles, cyclists, and pedestrians. In some embodiments, the sensor 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensor 1360 and the location unit 1310 are combined.

Although not shown separately, the vehicle 1050 may include a trajectory controller. For example, the controller 1300 may include a trajectory controller. The trajectory controller may be operable to obtain information describing a current state of the vehicle 1050 and a route planned for the vehicle 1050, and, based on this information, to determine and optimize a trajectory for the vehicle 1050. In some embodiments, the trajectory controller outputs signals operable to control the vehicle 1050 such that the vehicle 1050 follows the trajectory that is determined by the trajectory controller. For example, the output of the trajectory controller can be an optimized trajectory that may be supplied to the powertrain 1200, the wheels 1400/1410/1420/1430, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400/1410/1420/1430 may be a steered wheel, which is pivoted to a steering angle under control of the steering unit 1230, a propelled wheel, which is torqued to propel the vehicle 1050 under control of the transmission 1220, or a steered and propelled wheel that steers and propels the vehicle 1050.

A vehicle may include units, or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

Figure 2:
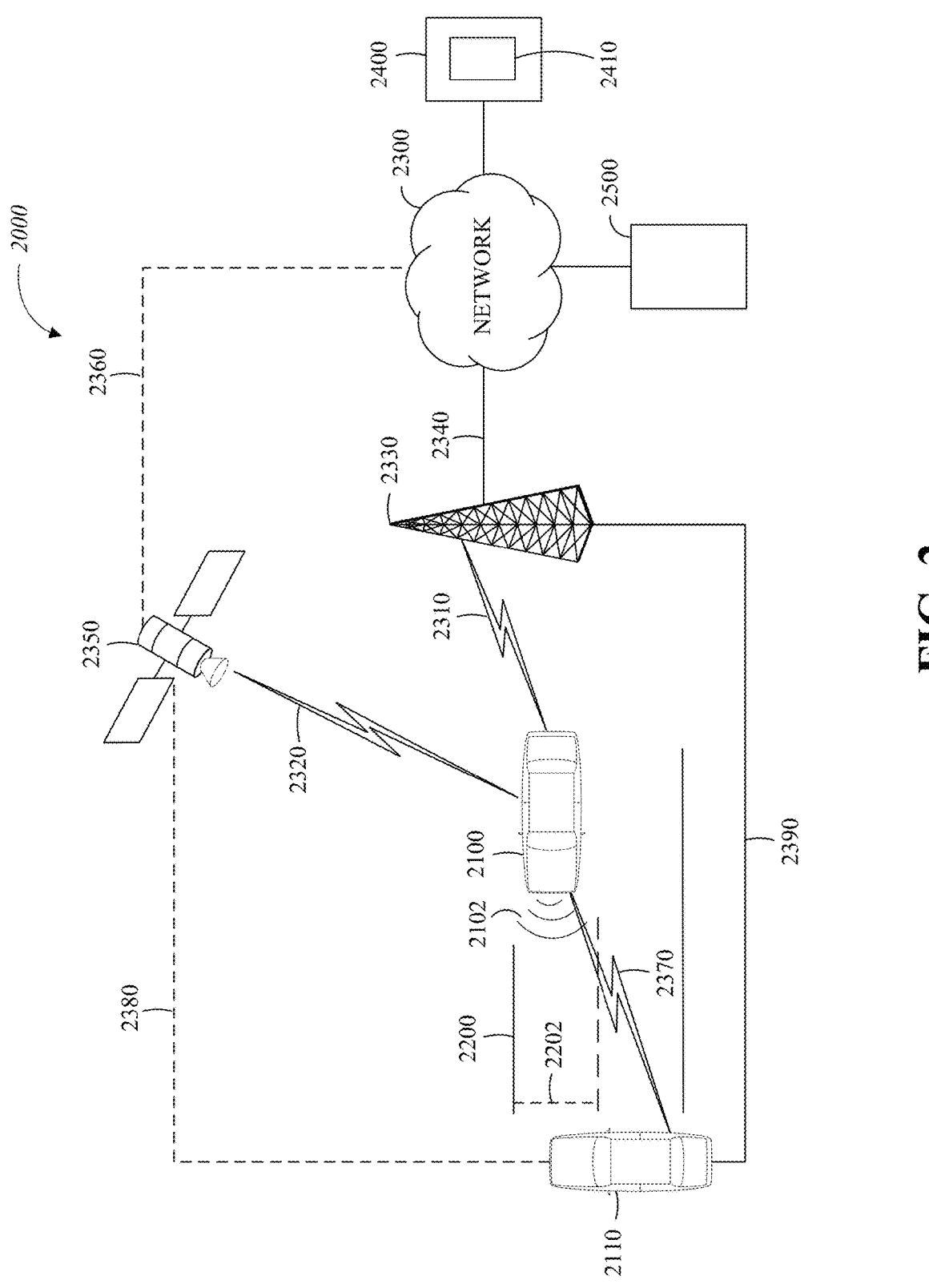
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system 2000 in which the aspects, features, and elements disclosed herein may be implemented. The vehicle transportation and communication system 2000 includes a vehicle 2100, such as the vehicle 1050 shown in FIG. 1, and one or more external objects, such as an external object 2110, which can include any form of transportation, such as the vehicle 1050 shown in FIG. 1, a pedestrian, cyclist, as well as any form of a structure, such as a building. The vehicle 2100 may travel via one or more portions of a transportation network 2200, and may communicate with the external object 2110 via one or more of an electronic communication network 2300. Although not explicitly shown in FIG. 2, a vehicle may traverse an area that is not expressly or completely included in a transportation network, such as an off-road area. In some embodiments the transportation network 2200 may include one or more of a vehicle detection sensor 2202, such as an inductive loop sensor, which may be used to detect the movement of vehicles on the transportation network 2200.

The electronic communication network 2300 may be a multiple access system that provides for communication, such as voice communication, data communication, video communication, messaging communication, or a combination thereof, between the vehicle 2100, the external object 2110, and an operations center 2400. For example, the vehicle 2100 or the external object 2110 may receive information, such as information representing the transportation network 2200, from the operations center 2400 via the electronic communication network 2300.

The operations center 2400 includes a controller apparatus 2410 which includes some or all of the features of the controller 1300 shown in FIG. 1. The controller apparatus 2410 can monitor and coordinate the movement of vehicles, including autonomous vehicles. The controller apparatus 2410 may monitor the state or condition of vehicles, such as the vehicle 2100, and external objects, such as the external object 2110. The controller apparatus 2410 can receive vehicle data and infrastructure data including any of: vehicle velocity; vehicle location; vehicle operational state; vehicle destination; vehicle route; vehicle sensor data; external object velocity; external object location; external object operational state; external object destination; external object route; and external object sensor data.

Further, the controller apparatus 2410 can establish remote control over one or more vehicles, such as the vehicle 2100, or external objects, such as the external object 2110. In this way, the controller apparatus 2410 may teleoperate the vehicles or external objects from a remote location. The controller apparatus 2410 may exchange (send or receive) state data with vehicles, external objects, or computing devices such as the vehicle 2100, the external object 2110, or a server computing device 2500, via a wireless communication link such as the wireless communication link 2380 or a wired communication link such as the wired communication link 2390.

The server computing device 2500 may include one or more server computing devices which may exchange (send or receive) state signal data with one or more vehicles or computing devices including the vehicle 2100, the external object 2110, or the operations center 2400, via the electronic communication network 2300.

In some embodiments, the vehicle 2100 or the external object 2110 communicates via the wired communication link 2390, a wireless communication link 2310/2320/2370, or a combination of any number or types of wired or wireless communication links. For example, as shown, the vehicle 2100 or the external object 2110 communicates via a terrestrial wireless communication link 2310, via a non-terrestrial wireless communication link 2320, or via a combination thereof. In some implementations, a terrestrial wireless communication link 2310 includes an Ethernet link, a serial link, a Bluetooth link, an infrared (IR) link, an ultraviolet (UV) link, or any link capable of providing for electronic communication.

A vehicle, such as the vehicle 2100, or an external object, such as the external object 2110 may communicate with another vehicle, external object, or the operations center 2400. For example, a host, or subject, vehicle 2100 may receive one or more automated inter-vehicle messages, such as a basic safety message (BSM), from the operations center 2400, via a direct communication link 2370, or via an electronic communication network 2300. For example, operations center 2400 may broadcast the message to host vehicles within a defined broadcast range, such as three hundred meters, or to a defined geographical area. In some embodiments, the vehicle 2100 receives a message via a third party, such as a signal repeater (not shown) or another remote vehicle (not shown). In some embodiments, the vehicle 2100 or the external object 2110 transmits one or more automated inter-vehicle messages periodically based on a defined interval, such as one hundred milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system state data, throttle information, steering wheel angle information, or vehicle routing information, or vehicle operating state information, such as vehicle size information, headlight state information, turn signal information, wiper state data, transmission information, or any other information, or combination of information, relevant to the transmitting vehicle state. For example, transmission state information indicates whether the transmission of the transmitting vehicle is in a neutral state, a parked state, a forward state, or a reverse state.

In some embodiments, the vehicle 2100 communicates with the electronic communication network 2300 via an access point 2330. The access point 2330, which may include a computing device, may be configured to communicate with the vehicle 2100, with the electronic communication network 2300, with the operations center 2400, or with a combination thereof via wired or wireless communication links 2310/2340. For example, an access point 2330 is a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point can include any number of interconnected elements.

The vehicle 2100 may communicate with the electronic communication network 2300 via a satellite 2350, or other non-terrestrial communication device. The satellite 2350, which may include a computing device, may be configured to communicate with the vehicle 2100, with the electronic communication network 2300, with the operations center 2400, or with a combination thereof via one or more communication links 2320/2360. Although shown as a single unit, a satellite can include any number of interconnected elements.

The electronic communication network 2300 may be any type of network configured to provide for voice, data, or any other type of electronic communication. For example, the electronic communication network 2300 includes a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the Hyper Text Transport Protocol (HTTP), or a combination thereof. Although shown as a single unit, an electronic communication network can include any number of interconnected elements.

In some embodiments, the vehicle 2100 communicates with the operations center 2400 via the electronic communication network 2300, access point 2330, or satellite 2350. The operations center 2400 may include one or more computing devices, which are able to exchange (send or receive) data from: vehicles such as the vehicle 2100; external objects including the external object 2110; or computing devices such as the server computing device 2500.

In some embodiments, the vehicle 2100 identifies a portion or condition of the transportation network 2200. For example, the vehicle 2100 may include one or more on-vehicle sensors 2102, such as the sensor 1360 shown in FIG. 1, which includes a speed sensor, a wheel speed sensor, a camera, a gyroscope, an optical sensor, a laser sensor, a radar sensor, a sonic sensor (e.g., a microphone or acoustic sensor), a compass, or any other sensor or device or combination thereof capable of determining or identifying a portion or condition of the transportation network 2200.

The vehicle 2100 may traverse one or more portions of the transportation network 2200 using information communicated via the electronic communication network 2300, such as information representing the transportation network 2200, information identified by one or more on-vehicle sensors 2102, or a combination thereof. The external object 2110 may be capable of all or some of the communications and actions described above with respect to the vehicle 2100.

For simplicity, FIG. 2 shows the vehicle 2100 as the host vehicle, the external object 2110, the transportation network 2200, the electronic communication network 2300, and the operations center 2400. However, any number of vehicles, networks, or computing devices may be used. In some embodiments, the vehicle transportation and communication system 2000 includes devices, units, or elements not shown in FIG. 2. Although the vehicle 2100 or external object 2110 is shown as a single unit, a vehicle can include any number of interconnected elements.

Although the vehicle 2100 is shown communicating with the operations center 2400 via the electronic communication network 2300, the vehicle 2100 (and external object 2110) may communicate with the operations center 2400 via any number of direct or indirect communication links. For example, the vehicle 2100 or external object 2110 may communicate with the operations center 2400 via a direct communication link, such as a Bluetooth communication link. Although, for simplicity, FIG. 2 shows one of the transportation network 2200, and one of the electronic communication network 2300, any number of networks or communication devices may be used.

Figure 3:
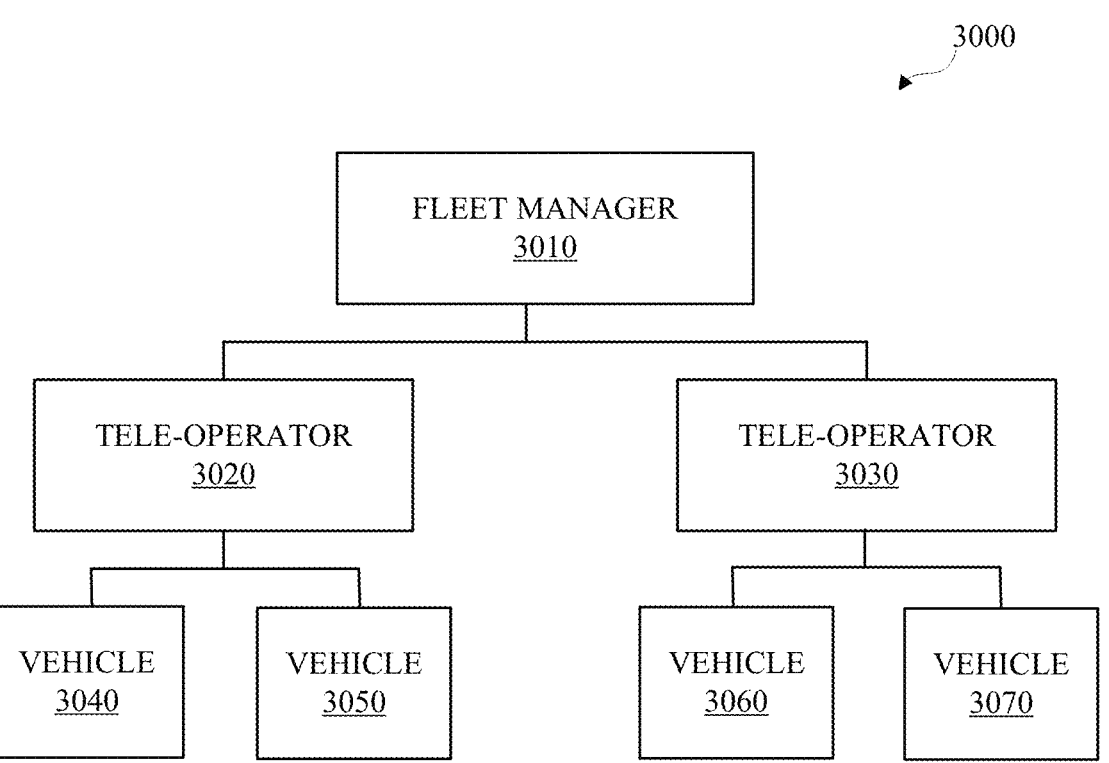
FIG. 3 is a block diagram illustrating a remote vehicle assistance center according to implementations of this disclosure.

FIG. 3 is a block diagram illustrating a remote vehicle assistance center 3000 according to implementations of this disclosure. The remote vehicle assistance center 3000 can also be referred to as a remote system or a tele-operations center. The remote vehicle assistance center 3000 includes a fleet manager 3010, a plurality of vehicle managers (i.e., tele-operators) including but not limited to a tele-operator 3020 and a tele-operator 3030, and a plurality of vehicles including but not limited to vehicles 3040, 3050, 3060, and 3070.

The fleet manager 3010 can include an apparatus including some or all of the features of the controller 1300 shown in FIG. 1 or the controller apparatus 2410 of FIG. 2. The fleet manager 3010 can monitor and coordinate tele-operators, including the tele-operators 3020/3030 as well as the movement of vehicles, including autonomous vehicles, and the vehicles 3040, 3050, 3060, and 3070. Monitoring and coordinating the tele-operators can include any of assigning, allocating, or deallocating vehicles to the tele-operators; reviewing and monitoring performance data of the tele-operators; and assigning tele-operators to a geographic area. In an implementation, there can be multiple fleet managers, who may in turn be managed or under the authority of other fleet managers.

The tele-operator 3020 can monitor the state or condition of vehicles, including the vehicle 3040 and the vehicle 3050. As illustrated in FIG. 3, the tele-operator 3020 has been assigned vehicle 3040 and vehicle 3050. The assignment of vehicles to a tele-operator can be performed by a fleet manager such as the fleet manager 3010.

The tele-operator 3030 can monitor the state or condition of vehicles, including the vehicle 3060 and the vehicle 3070. As illustrated in FIG. 3, the tele-operator 3030 has been assigned vehicle 3060 and vehicle 3070. The assignment of vehicles to a tele-operator can be performed by a fleet manager such as the fleet manager 3010. The assignment of vehicles to a tele-operator can also be automated using machine learning techniques.

In an implementation, the tele-operators can cluster or group the vehicles, establish communication with occupants in the vehicle, remotely operate the vehicles, and coordinate the movement of the vehicles through a transportation network or around various obstacles such as traffic congestion. The tele-operators can interact with other tele-operators to aid in the monitoring and management of the vehicles.

The vehicles including the vehicle 3040/3050/3060/3070 comprise vehicles such as the vehicle 2100 as shown in FIG. 2, that are being monitored or coordinated by the fleet manager 3010. The vehicles can be operated autonomously or by a human driver and can exchange (send and receive) vehicle data relating to the state or condition of the vehicle and its surroundings including any of vehicle velocity; vehicle location; vehicle operational state; vehicle destination; vehicle route; vehicle sensor data; external object velocity; and external object location.

In the description herein, sentences describing the autonomous vehicle as taking an action (such as performing, determining, initiating, receiving, calculating, deciding, etc.) are to be understood that some appropriate module of the AV as taking the action. Such modules may be stored in a memory of the AV, such as the memory 1340 of FIG. 1, and executed by a processor, such as the processor 1330 of FIG. 1. Such modules may be partially or fully included in a controller apparatus, such as the controller apparatus 2410 of FIG. 2 and may be partially or fully executed by a processor of the AV, a processor of an operations center, or a combination thereof. For example, the statement "the AV determines a trajectory" can be understood to mean that "a module of the AV determines a trajectory" or "a trajectory planning module of the AV determines a trajectory."

Figure 4:
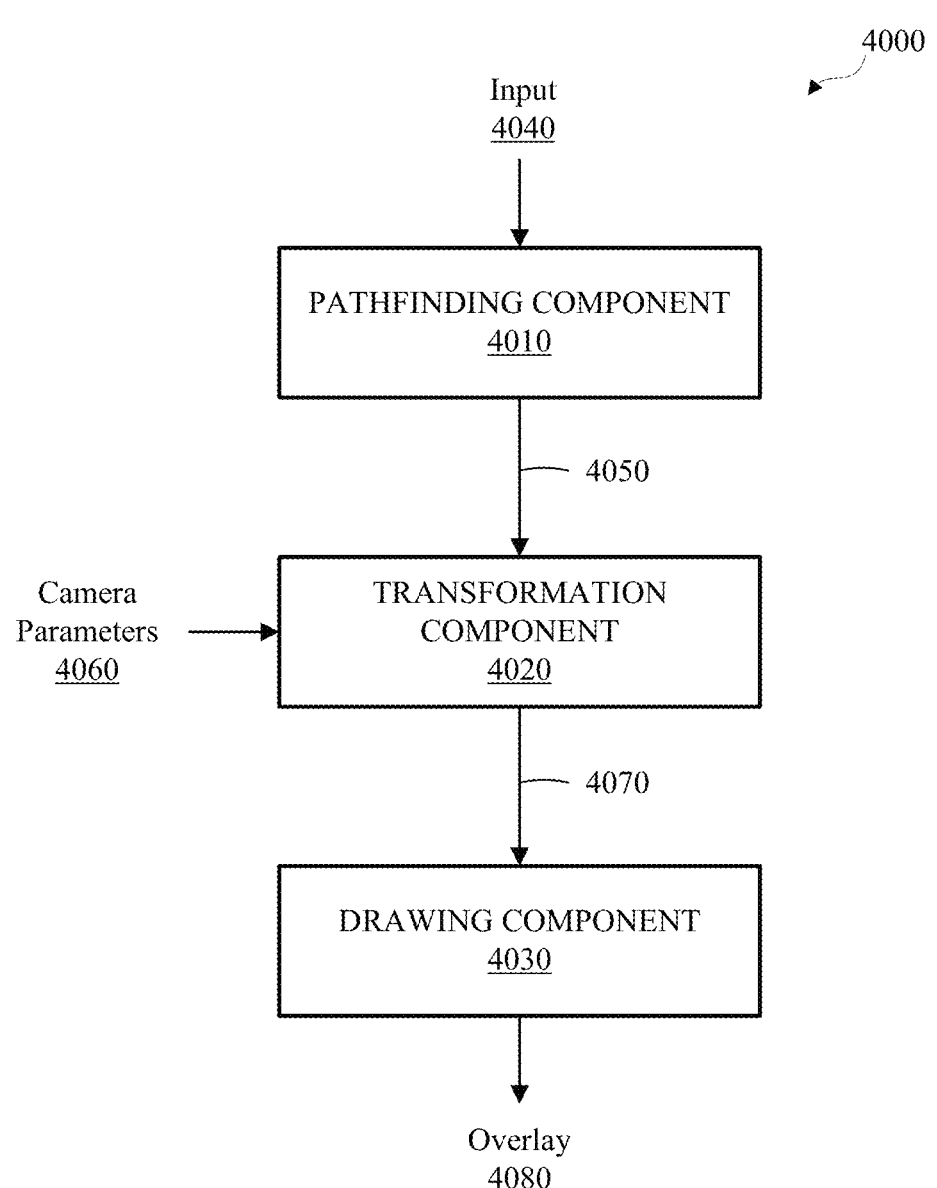
FIG. 4 is a block diagram of an example of a system for displaying an overlay including a projected path of a vehicle.

FIG. 4 is a block diagram of an example of a system 4000 for displaying an overlay 4080 including a projected path of a vehicle. For example, the system 4000 could be implemented by the controller apparatus 2410 of FIG. 2. In another example, the system 4000 could be implemented by computing devices or a server of the operations center 2400. The system 4000 could be used by a tele-operator to perform tele-operation of a vehicle, such as the tele-operators 3020/3030 performing tele-operation of the vehicle 3040/3050/3060/3070 of FIG. 3.

The system 4000 may include a pathfinding component 4010, a transformation component 4020, and a drawing component 4030. The system 4000 can receive a video stream from a camera of a vehicle (e.g., the sensor 1360 of the vehicle 1050 of FIG. 1) in a transportation network (e.g., the vehicle 2100 in the transportation network 2200 of FIG. 2). For example, the camera could be configured as a front facing camera arranged on top of the vehicle. The system 4000 can also receive an input 4040 from a tele-operator. The input 4040 may indicate a steering angle and/or a distance to travel. The system 4000 can then determine a projected path of the vehicle in the transportation network based on the input 4040. For example, the system 4000 can utilize the pathfinding component 4010 to determine the projected path. The pathfinding component 4010 can take the input 4040, such as the steering angle and/or the distance to travel, and utilize the Ackermann model to determine a radius of a curve of the projected path. The pathfinding component 4010 can then utilize trigonometric and/or geometric calculations to determine three dimensional spatial coordinates of the projected path to generate a path output 4050.

Figure 5:
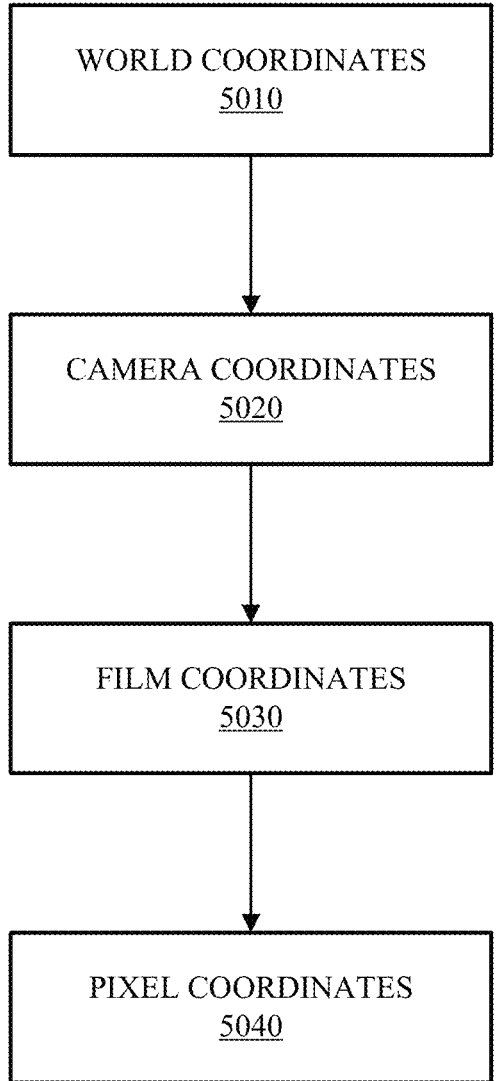
FIG. 5 is an example of transforming spatial coordinates to pixel coordinates.

With additional reference to FIG. 5, in some cases, the spatial coordinates determined by the pathfinding component 4010 may be world coordinates 5010. For example, the world coordinates 5010 may be coordinates relative to the transportation network (e.g., the transportation network 2200). In some cases, the spatial coordinates determined by the pathfinding component 4010 may be camera coordinates 5020. For example, the camera coordinates 5020 may be coordinates relative to the camera of the vehicle. When the spatial coordinates are the world coordinates 5010, the transformation component 4020 can convert the world coordinates 5010 to the camera coordinates 5020.

Referring again to FIG. 4, the system 4000 can determine, from the spatial coordinates, two dimensional pixel coordinates in the video stream corresponding to the projected path. For example, the system 4000 can utilize the transformation component 4020 to process the spatial coordinates from the path output 4050. The transformation component 4020 can reference camera parameters 4060 that are intrinsic to the camera of the vehicle to determine the pixel coordinates. For example, the camera parameters 4060 could indicate an orientation of the camera, such as the camera's height above ground, and/or a resolution of the camera. The transformation component 4020 can convert the spatial coordinates into pixel coordinates, based on the camera parameters 4060, to generate a transformation output 4070.

With additional reference to FIG. 5, the transformation component 4020 can convert the spatial coordinates (e.g., the world coordinates 5010 or the camera coordinates 5020) into film coordinates 5030. The film coordinates 5030 may correspond to coordinates in a focal plane of the camera (e.g., the video stream). The transformation component 4020 can further convert the film coordinates 5030 into pixel coordinates 5040. The pixel coordinates 5040 can correspond to coordinates of pixels in the GUI or HTML canvas used by the tele-operator.

Referring again to FIG. 4, the system 4000 can utilize the drawing component 4030 to apply spline interpolation based on the pixel coordinates (e.g., the pixel coordinates 5040). The drawing component 4030 can then generate the overlay 4080 that is output to the GUI or HTML canvas used by the tele-operator. The drawing component 4030 can draw the overlay 4080 as a smooth curve representing the projected path on the video stream. The overlay 4080 can include a visualization of the projected path of the vehicle to assist the tele-operator to perform the tele-operation of the vehicle.

Figure 6:
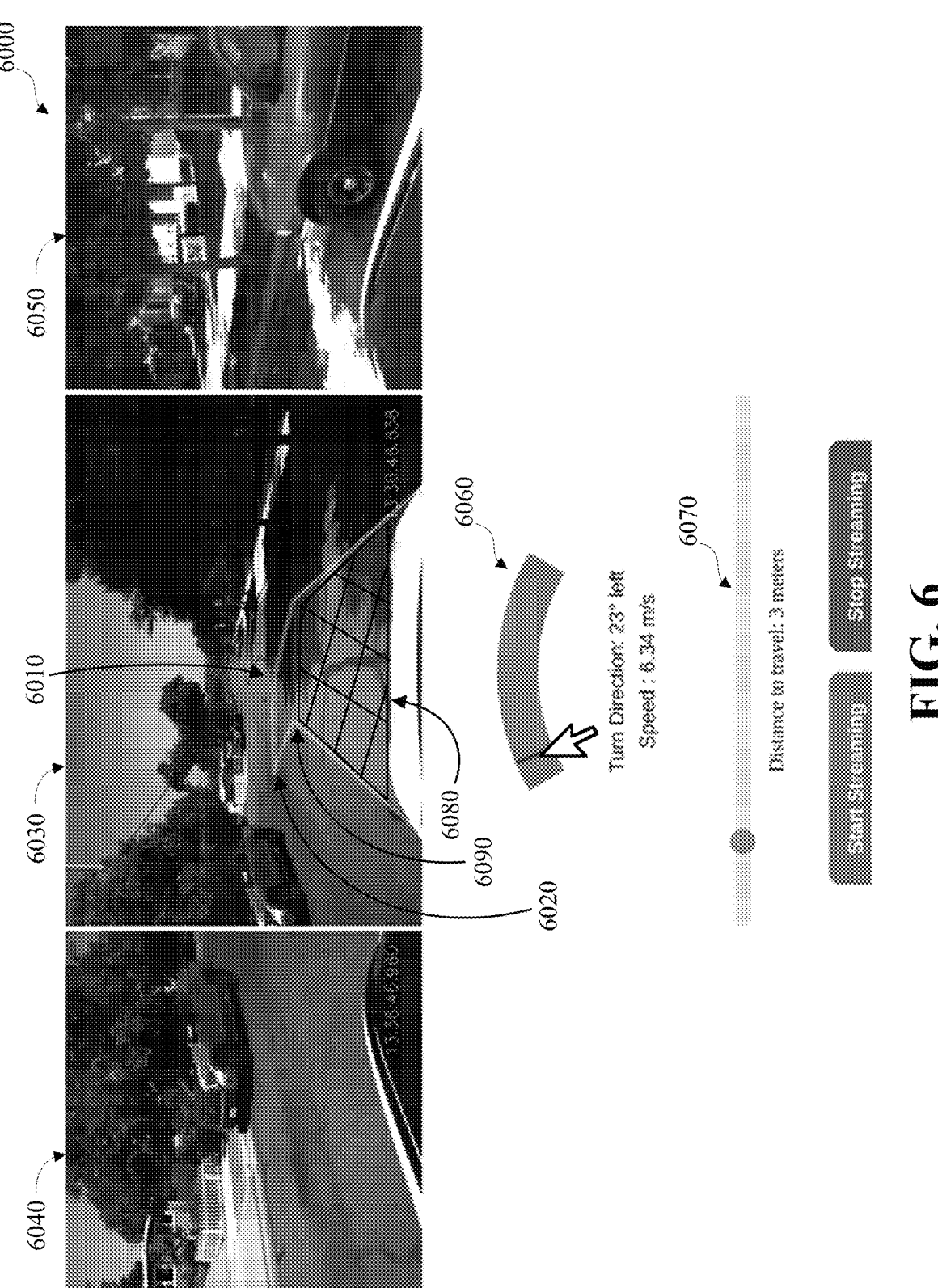
FIG. 6 is an example of a graphical user interface (GUI) displaying an overlay including a projected path of a vehicle.

FIG. 6 is an example of a GUI 6000 displaying an overlay 6010 including a projected path 6020 of a vehicle. The GUI 6000 could be used to assist a tele-operator to perform tele-operation of the vehicle, such as the tele-operators 3020/3030 performing tele-operation of the vehicle 3040/3050/3060/3070 of FIG. 3. For example, the system 4000 of FIG. 4 can generate the overlay 6010, corresponding to the overlay 4080. The GUI 6000 could comprise an HTML canvas or webpage displayed through a web interface.

The GUI 6000 may include a video stream 6030 from a camera of a vehicle in a transportation network (e.g., the vehicle 2100 in the transportation network 2200 of FIG. 2). For example, the video stream 6030 could correspond to a camera configured as a front facing camera arranged on top of the vehicle. In some implementations, the GUI 6000 may include additional video streams from additional cameras of the vehicle. For example, the GUI 6000 may include a second video stream 6040 from a second camera configured as a left facing camera, and a third video stream 6050 from a third camera configured as a right facing camera. The additional cameras may provide additional views for the tele-operator to further improve situational awareness.

The system 4000 can receive input (e.g., the input 4040) through the GUI 6000. The input may include a steering angle and/or a distance to travel. For example, the GUI 6000 may include a steering area 6060 to configure the steering angle. The steering area 6060 could represent a virtual steering wheel, such as by depicting a portion of a wheel or an arc. The system can detect a mouse hovering over a position in the steering area 6060 in the GUI 6000, which could correspondingly configure the steering angle. Configuring the steering angle, in turn, can cause the system to display the overlay 6010 in the video stream 6030, including a visualization of the projected path 6020. The overlay 6010 could be represented in the GUI 6000 by lines corresponding to a lane of travel. Further, configuring a different steering angle via the steering area 6060 can cause the overlay 6010 (e.g., the projected path 6020) to correspondingly change in the video stream 6030. In various implementations, the system can receive the steering angle in different ways. For example, the system could receive the steering angle from a keyboard, joystick, game controller, steering wheel, pedal, or other device. The GUI 6000 can update to show a current steering angle that is configured.

In another example, the GUI 6000 may include a distance area 6070 to configure the distance to travel. The distance area 6070 could represent a virtual length, such as by depicting a slider. The system can detect a position in the distance area 6070 in the GUI 6000, such as by a mouse dragging the slider or a wheel of the mouse scrolling, which could correspondingly configure the distance. Configuring the distance, in turn, can cause the system to display the overlay 6010 in the video stream 6030, including a visualization of the projected path 6020. Further, configuring a different distance via the distance area 6070 can cause the overlay 6010 (e.g., the projected path 6020) to correspondingly change in the video stream 6030. In various implementations, the system can receive the distance in different ways. For example, the system could receive the distance from a keyboard, joystick, game controller, steering wheel, pedal, or other device. The GUI 6000 can update to show the current distance that is configured.

As a result, the overlay 6010 may enable visualizing the projected path 6020 of the vehicle in the video stream 6030, including while the vehicle is in motion. For example, the tele-operator could hover a mouse in a left portion of the steering area 6060 with a shorter distance to travel (e.g., 3 meters) in the distance area 6070 and see the projected path 6020 in the video stream 6030 corresponding to a sharp left turn. The tele-operator could then increase the distance in the distance area 6070 (e.g., 10 meters) and see the projected path 6020 in the video stream 6030 corresponding to a wider left turn. The tele-operator could then hover the mouse in a right portion of the steering area 6060 and see the projected path 6020 in the video stream 6030 corresponding to a wider right turn. The tele-operator could then decrease the distance in the distance area 6070 (e.g., back to 3 meters) and see the projected path 6020 in the video stream 6030 corresponding to a sharp right turn. The tele-operator could make such changes, and the overlay 6010 (e.g., including the projected path 6020) could update in the video stream 6030, whether the vehicle is stopped or in motion as seen in the video stream 6030.

The system can then receive a selection of the overlay 6010. For example, the tele-operator could experiment with different steering angles and/or distances to travel to see differences in the overlay 6010 (e.g., differences in projected path 6020). When the tele-operator is satisfied with a particular configuration of the overlay 6010, the tele-operator can select the particular overlay. For example, the tele-operator could select the overlay 6010 by clicking a button of the mouse, and the system can receive the selection by detecting the clicking of the button. Based on the selection, the system can transmit information to the vehicle that is configured to cause the vehicle to follow a path corresponding to the projected path 6020 if safe to do so. The vehicle, utilizing its own sensors and safety modules, can determine to follow the path (or not follow the path) based on whether it is determined safe to do so.

In some implementations, the system can predict a position 6080 of the vehicle in the video stream 6030. The position 6080 can be predicted based on a latency associated with the video stream 6030. For example, the system can predict an actual, real-time location of the vehicle in the video stream 6030 based on timing associated with receiving the video stream 6030 through the network. The system can include an indication of the position 6080 in the overlay 6010 on the video stream 6030. For example, the indication of the position 6080 could be color coded in the GUI 6000 depending on the latency that is predicted, such as green for lesser latency, yellow for moderate latency, and red for greater latency. This may enable the tele-operator to estimate where the vehicle is in the video stream 6030 at the moment the overlay 6010 is displayed. Further, the projected path 6020 in the overlay 6010 can start from a point 6090 in the overlay 6010 corresponding to the predicted position of the vehicle. For example, the point 6090 could represent an actual, real-time location of the front of vehicle. Changes in the projected path 6020 can be displayed starting from the point 6090. As a result, the tele-operator can correctly visualize possible projected paths that the vehicle could perform (as opposed to projected paths that are no longer possible due to the vehicle having moved on).

The overlay 6010, including the visualization of the projected path 6020, may be drawn on the video stream 6030 received from a front camera of the vehicle. The overlay 6010 may assist a tele-operator to visually see the path the vehicle will travel given a distance and steering angle and may help to take action to avoid obstructions along the path. The overlay 6010 can be generated by the system 4000 utilizing pathfinding component 4010, the transformation component 4020, and the drawing component 4030 of FIG. 4. In addition to drawing the overlay 6010 on the video stream 6030, the system 4000 can send information, such as steering angle and distance measurements, to the vehicle to navigate the vehicle according to the visualization of the projected path 6020.

Figure 7:
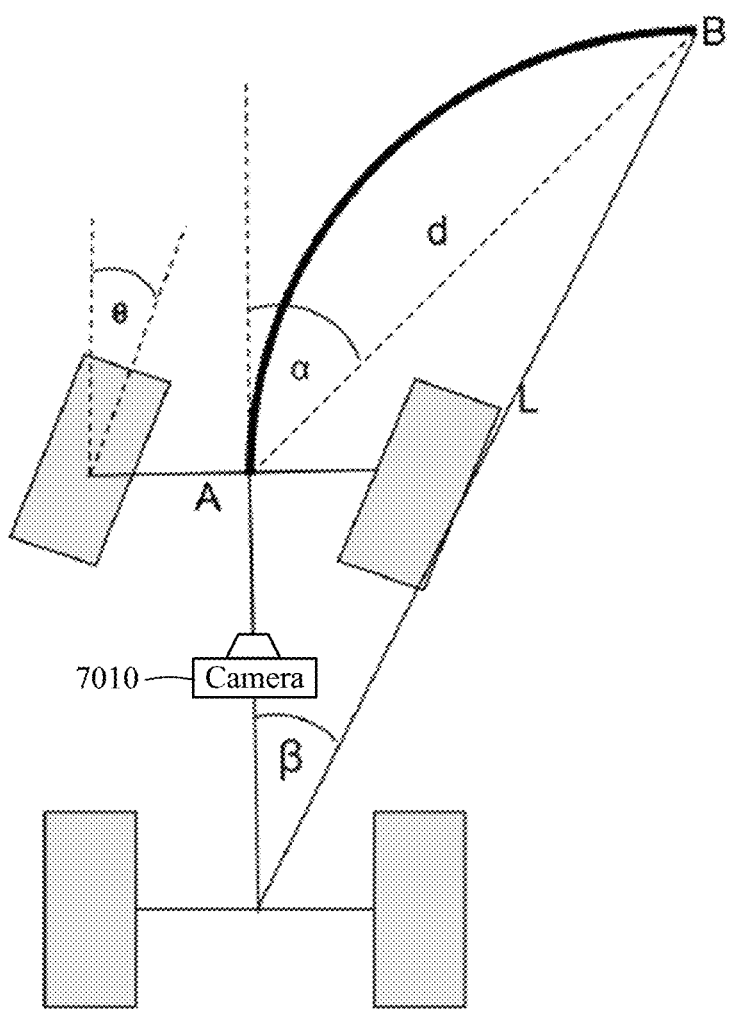
FIG. 7 is a diagram of an example of determining a projected path of a vehicle in a transportation network.

The pathfinding component 4010 can determine the projected path 6020 based on motion data associated with the vehicle. For example, given the wheel angle and certain distance at a particular angle from the front of the vehicle, the pathfinding component 4010 can determine the path the vehicle will take in order to traverse the distance. With additional reference to FIG. 7, θ is the steering angle and the point A is the mid-point of the front axle of the vehicle. The distance between points A and B may be "d" meters. Given the angle θ and the distance d, the pathfinding component 4010 can determine the bolded curved path that the vehicle will take to reach the point B (e.g., the projected path 6020). Note that the pathfinding component 4010 might not have the location of the point B or the angle α. However, the pathfinding component 4010 can determine the radius of the curve using the angle θ. Once the curve is determined, the pathfinding component 4010 can determine the point B on the curve such that the length of AB is the distance d. Once the line AB is determined, the pathfinding component 4010 can find the angle α by utilizing trigonometric functions. To generate drive goals, the vehicle may utilize, the distance of point B from the midpoint of the rear wheel and the angle at the rear axle. Thus, the pathfinding component 4010 can output the angle β and the length L as shown in FIG. 7.

Figure 8:
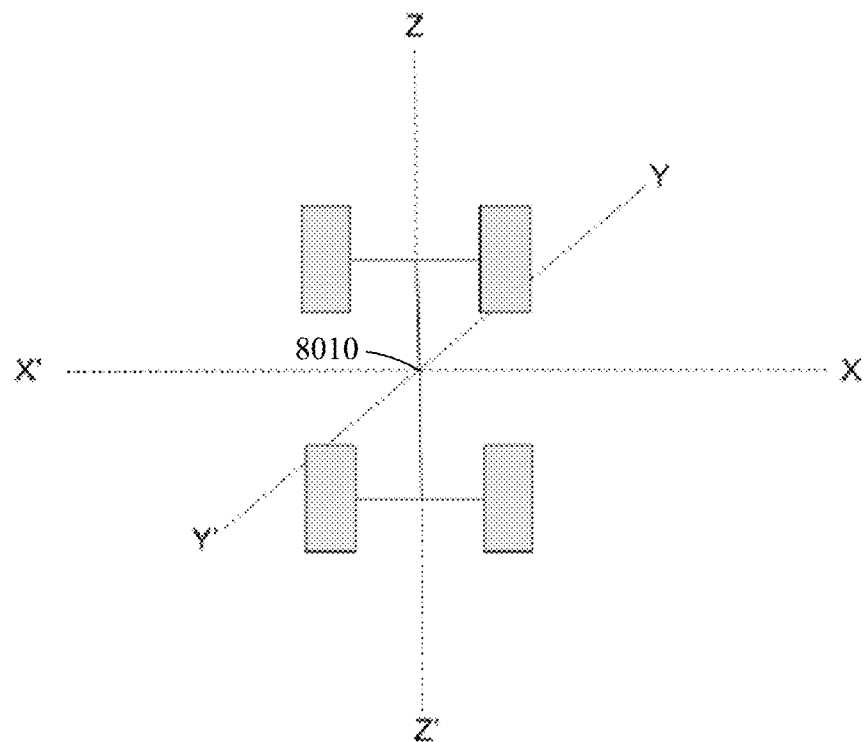
FIG. 8 is a diagram of an example of spatial coordinates in a transportation network.

With additional reference to FIG. 8, the coordinate system used by the pathfinding component 4010 may have an origin 8010 at the location of the camera 7010, which could be attached on the top of the vehicle at the mid-point. Utilizing the camera 7010 as the origin 8010 may simplify calculations by the transformation component 4020. In some cases, the camera 7010 may be at other locations of the vehicle, and the transformation component 4020 can determine offset between the origin 8010 and the other location. In this example, a positive X-axis may be towards the right of the vehicle, a positive Y-axis may be in the up direction perpendicular to the ground, and a positive Z-axis may be towards the front of the vehicle.

For example, the pathfinding component 4010 can determine the coordinates of the wheels utilizing the vehicle measurements and the location of the installed camera 7010 with respect to the vehicle. The camera 7010 could be installed on the line joining the mid-points of the front axle and rear axle of the vehicle. This may result in the following exemplar measurements:

Distance of the camera 7010 from the front axle: 1666 mm

Distance of the camera 7010 from the rear axle: 1030 mm

Track width of the vehicle: 1256 mm

Then the (X, Z) coordinate of the front left wheel may be (−1256/2, 1666)=(−628, 1666); the (X, Z) coordinate of the front right wheel may be (1256/2, 1666)=(628, 1666); the (X, Z) coordinate of the rear left wheel may be (−1256/2, −1030)=(−628, −1030); and the (X, Z) coordinate of the rear right wheel may be (1256/2, −1030)=(628, −1030).

The ground may be considered flat. As a result, the Y-coordinate of any point on the ground may be (−height of the camera). That is, if the camera 7010 is installed at a height of 1600 mm, the points on the ground could have a coordinate of −1600.

Figure 9:
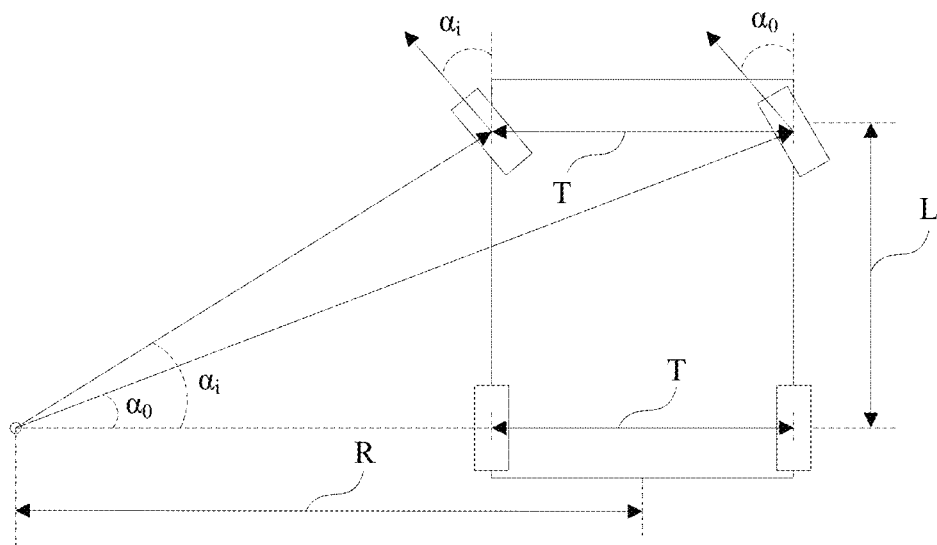
FIG. 9 is a diagram of an example of utilizing the Ackermann model.

With additional reference to FIG. 9, the pathfinding component 4010 can use Ackermann's model to find the radius of the curved paths. For example, from the Ackermann model, we know that:

$$\alpha_i = \tan^{-1}\left(L/(R - T/2)\right) \tag{1}$$

$$\alpha_0 = \tan^{-1}\left(L/(R + T/2)\right) \tag{2}$$

The pathfinding component 4010 can utilize equation (1) or equation (2) to determine the radius "R." For example, using equation (1) to determine R:

$$R = \left(L/\tan(\alpha_i)\right) + T/2 \qquad (3)$$

The radius R is the radius of the curve that the mid-point of the rear axle will follow. Each point of the vehicle may follow a separate curve along the path. The pathfinding component 4010 can determine the curves followed by the front wheels and the mid-point of the front axle. For example, the pathfinding component 4010 can determine the aforementioned radii of those curves utilizing the measurements (T, L) and the Pythagorean theorem. These curves may be arcs of different concentric circles. The center of these circles may lie at R distance from the mid-point of the rear axle as shown in FIG. 8. The center may lie either on the left or the right side of the rear axle depending on the turn direction. Determining the turn direction and R, the pathfinding component 4010 can determine the coordinate of the center using the coordinate system explained with respect to FIG. 8.

Figure 10:
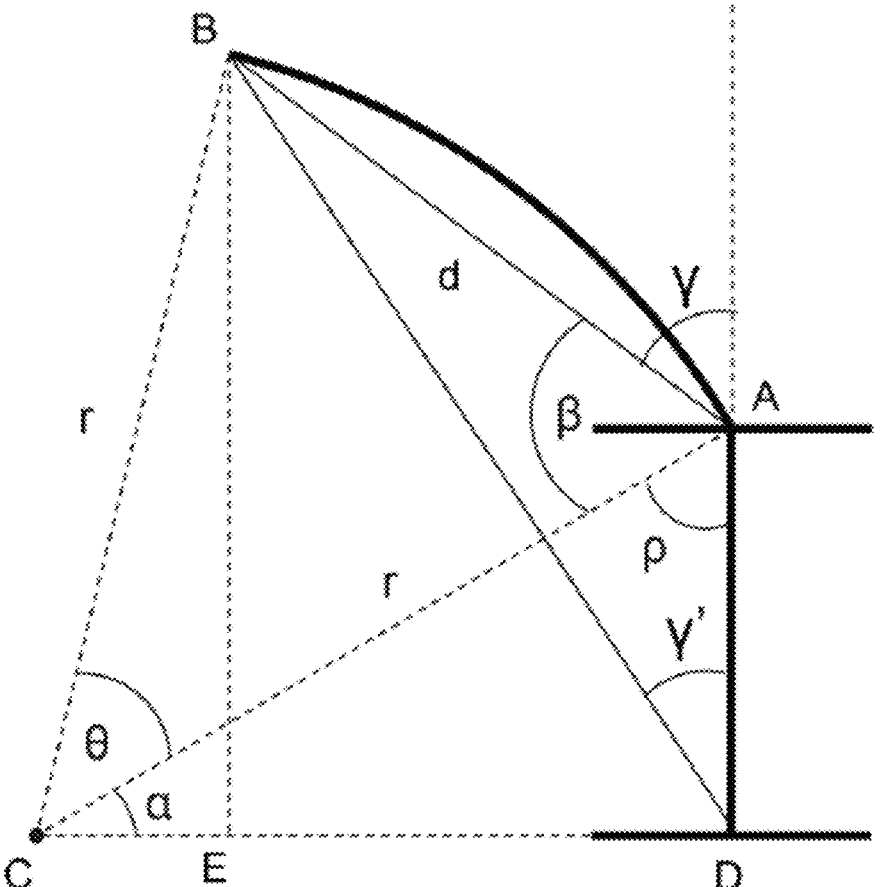
FIG. 10 is a diagram of an example of determining a radius of a projected path.

With additional reference to FIG. 10, once the path curves are determined, the pathfinding component 4010 can determine how far along the curves the vehicle should travel. The target point is defined as the destination point on the path taken by the mid-point of the front axle. The target point is at a user-defined distance "d" from the initial position of the mid-point of the front axle. The system can determine the coordinates of the target point utilizing some trigonometric calculations. In FIG. 10 (e.g., a left turn shown), B is the target point and the curve AB is the curve that the mid-point of the front axle will take. The curve AB may be treated as an arc of a circle centered at C. The pathfinding component 4010 can determine the points on the arc AB and the equation of the circle based on the location of the center and the radius r of the circle from Ackermann's model. The pathfinding component 4010 can determine the (X, Z) coordinates of B. Since, AB is an arc of a circle and the distance (e.g., a chord) between the points A and B is the distance d, the pathfinding component 4010 can determine the subtended angle θ.

$$\theta = 2 \sin^{-1}\left(d/2r\right) \qquad (4)$$

$$\alpha = \sin^{-1}\left(\text{length } (AD)/\text{length } (CD)\right) \qquad (5)$$

The lengths of AD and CD can be determined based on AD being the wheelbase and CD being the Ackermann radius R in equation (3). Using these values, the pathfinding component 4010 can find the lengths of CE and BE.

$$\text{length}\,(CE) = r \cos (\alpha + \theta)$$

$$\text{length}\,(BE) = r \sin (\alpha + \theta)$$

Based on the coordinates of the center C, the pathfinding component 4010 can determine the coordinates of B.

The coordinates of C may be $(x_c, z_c)$ and the coordinates of B may be $(x_b, z_b)$ $$x_b = xc + \text{length } (CE) \text{ if turn direction is left} \qquad (6)$$

$$xc - \text{length } (CE) \text{ if turn direction is right}$$

$$z_b = z_c + \text{length}\,(BE) \qquad (7)$$

Based on Δ ABC being an isosceles triangle, $$\theta + 2\beta = 180 \Rightarrow$$

$$\beta = (180 - \theta)/2$$

Based on Δ CAD being a right-angled triangle, $$p = 90 - \alpha$$

As a result:

$$\gamma + \beta + \rho = 180 \Rightarrow$$

$$\gamma = 180 - \beta - \rho \Rightarrow$$

$$\gamma = 180 - \left((180 - \theta)/2\right) - (90 - \alpha) \Rightarrow$$

$$\gamma = \alpha + \left(\theta/2\right)$$

Based on θ and α from equations (4) and (5), the pathfinding component 4010 can determine γ. The pathfinding component 4010 can then determine a final output value of γ and the length of BD based on the coordinates of point D (e.g., the mid-point of the rear axle) from the vehicle measurements and the coordinates of point B from equations (6) and (7). The pathfinding component 4010 can determine the length of BD by determining the distance between these two points. The pathfinding component 4010 can determine angle γ by using the sine rule of triangles.

$$\sin (\beta + \rho)/\text{length } (BD) = \sin (\gamma')/d \Rightarrow$$

$$\gamma' = \sin^{-1}\left(d \sin (\beta + \rho)/\text{length } (BD)\right)$$

As a result, the pathfinding component 4010 can determine the steering angle and distance values to generate drive goals for the vehicle (e.g., the projected path 6020).

Figure 11:
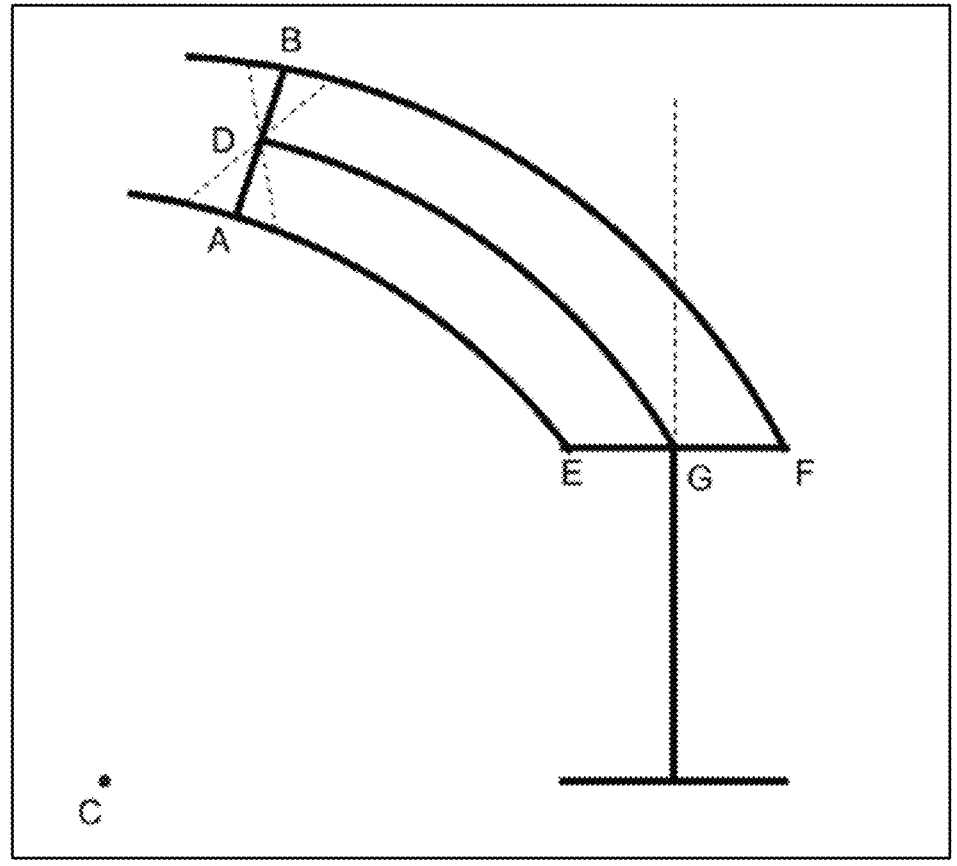
FIG. 11 is a diagram of an example of a projected path taken by wheels of a vehicle.

While the angle γ and length of the line BD in FIG. 10 may enable generating drive goals, the system 4000 can determine additional information to draw the overlay 6010. With additional reference to FIG. 11, the points E, F, and G are the initial positions of the left wheel, right wheel, and mid-point of the front axle respectively. The points A, B, and D may represent final positions after traveling the user-defined distance at a particular angle. D is the target point in this example. D can be determined as described above. As the angular velocities of the wheels and the mid-point of the front axle may be different, the coordinates A and B may be further determined. The dotted lines going through D as shown in FIG. 11 represent two of an infinite number of lines that can potentially be the front axle's final position. While these lines go through the target point D, there is one line that corresponds to the correct position of the front axle (e.g., the bolded line AB shown in FIG. 11). Determining the coordinates of A and B, the correct line can be drawn. Based on Ackermann's model, the center and radius of the arcs representing the path taken by front wheels can be determined, and the coordinates of the point on the arc can also be determined. The distance between A and D or B and D may be half of the length of the front axle. As a result, the pathfinding component 4010 can determine n points on each arc AB and BF with distances closest to half of the length of the front axle. Then, using those n points on each arc, the pathfinding component 4010 can generate pairs taking one point on each arc. The pathfinding component 4010 can determine the distance between the two points in each pair. The pathfinding component 4010 can then identify the pair that has a distance closest to the length of the front axle.

dist (p₁, p₂) is the distance between points $p_1$ and $p_2$ d is the length of the front axle A={a₁, a₂, a₃, . . . aₙ} is a set of points on the arc AE such that, for any point p on the arc AE where p∉A, |d/2−dist (D, $a_i$)|<|d/2−dist (D, p)|

B={b₁, b₂, b₃, . . . bₙ} is a set of points on the arc BF such that, for any point q on the arc AE where q∉B, |d/2−dist (D, $b_i$)|<|d/2−dist (D, q)|ap may be the desired point on arc AE and $b_q$ may be the desired point on arc BF ($a_p$, $b_q$)∈A×B, then

|d−dist ($a_p$, $b_q$)|<|d−dist ($a_i$, $b_j$)|, where ($a_i$, $b_j$)∈A×B and i, j∈{1, 2, 3, . . . , n} and i≠p and j≠q¿

Based on the end points on the arcs AE and BF, the radii and the center of the arcs, the pathfinding component 4010 can determine and/or draw the arcs and join the end points A and B with a straight line to complete the lane. The line AB may automatically go through the point D. The points may be three dimensional spatial coordinates in the world (e.g., the world coordinates 5010). Before drawing the points in the GUI or HTML canvas, the transformation component 4020 may be utilized to determine corresponding two dimensional coordinates of the point (e.g., to transform the three dimensional world points to two dimensional pixel points).

Referring again to FIGS. 4 and 5, the transformation component 4020 can transform coordinates between world coordinates 5010 (e.g., spatial coordinates relative to the transportation network 2200), camera coordinates 5020 (e.g., spatial coordinates relative to the location of the camera 7010), film coordinates 5030 (e.g., coordinates relative to a focal plane of the camera 7010), and/or pixel coordinates 5040 (e.g., pixel coordinates relative to the GUI 6000, or HTML canvas).

Figures 12, 13:
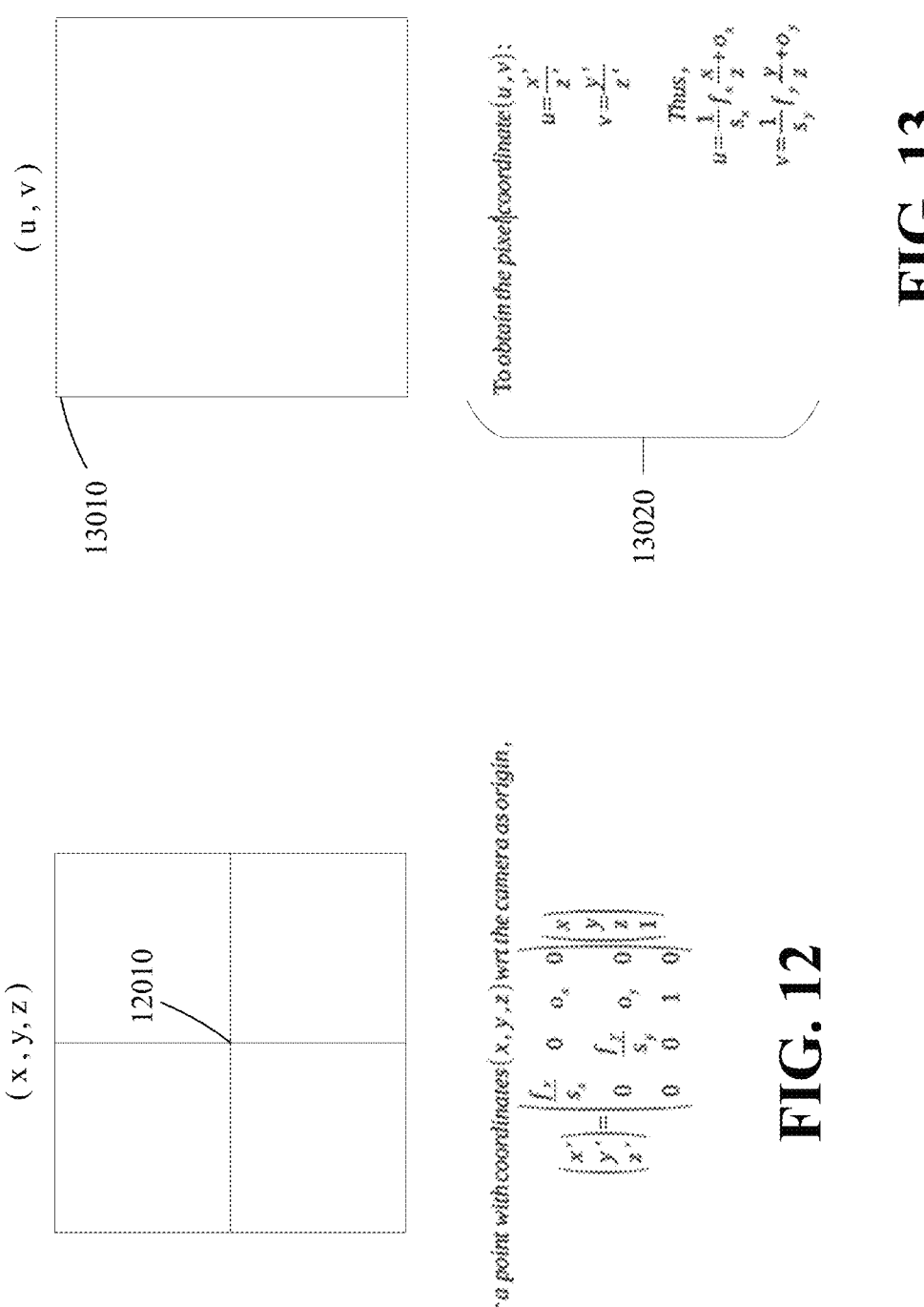
FIG. 12 is a diagram of an example of transforming camera coordinates to film coordinates.
FIG. 13 is a diagram of an example of transforming film coordinates to pixel coordinates.

In the example of FIGS. 7 and 8, with the coordinate system set with respect to the camera 7010 as the origin 8010, the transformation component 4020 need not transform from world coordinates 5010 to camera coordinates 5020 (e.g., camera coordinates 5020 are used). Transformation from camera coordinates 5020 to film coordinates 5030 transforms a three dimensional point to a two dimensional point on the camera film (e.g., the video stream). Until this step, the pathfinding component 4010 may have been working with coordinates in units of distance (e.g., millimeters). With additional reference to FIGS. 12 and 13, the next step involving the transformation component 4020 may convert the unit to pixels along with transforming the film coordinates 5030 to pixel coordinates 5040 having an origin 13010 at the top left corner. For example, FIG. 12 represents a camera film plane with an origin 12010 at the center (e.g., unit: millimeter), and FIG. 13 represents a pixel array with the origin 13010 at the top left corner (unit: pixel). These two steps of transformation (e.g., camera coordinates 5020 to film coordinates 5030, and film coordinates 5030 to pixel coordinates 5040) can be combined into the matrix formula shown at 12020, and to obtain the pixel coordinates (u, v), the pixel formula shown at 13020. For some cameras, the film coordinates 5030 may be inverted (e.g., opposite to the one show in FIG. 12). For those cases, the transformation component 4020 may invert the signs the pixel formula shown at 13020 as follows:

$$u = -(1/s_x)f_x((x/z) + o_x)$$
$$v = -(1/s_y)f_y((y/z) + o_y)$$

$f_x$=focal length x $f_y$=focal length y $s_x$=pixel density (pixel/mm) along x axis $s_y$=pixel density (pixel/mm) along y axis $o_x$=x coordinate of the Center (in pixel)

$o_y$=y coordinate of the Center (in pixel)

The foregoing parameters can be determined, for example, from a camera specification. In some cases, $f_x$ and $f_y$ may be the same number denoted by f.

Based on the foregoing, the transformation component 4020 can determine (u, v) which are the pixel coordinates 5040 of the three dimensional point on the film. In some cases, the pixel dimensions (e.g., width and height) of the film may not be same as the dimensions of the GUI 6000 (e.g., the HTML canvas). Further, in some cases, the original image may be cropped before putting the image on in the GUI 6000. To address the cropping and scaling, the transformation component 4020 can implement a further transformation (e.g., the values in this step are in pixels).

$w_1$ and $w_2$ are widths of camera film and the GUI/canvas respectively.

$h_1$ and $h_2$ are heights of camera film and GUI/canvas respectively.

$x_{left}$ and $x_{right}$ are measurements by which original image is cropped from left and right respectively before putting image on the GUI/canvas.

$y_{left}$ and $y_{right}$ are measurements by which original image is cropped from top and bottom respectively before putting image on the GUI/canvas.

Final pixel coordinates of point for the GUI/canvas may be, $$u_{final} = (w_2(u - x_{left}))/w_1$$
$$v_{final} = (h_2(v - y_{top}))/h_1$$

With the final coordinates of the point (e.g., the pixel coordinates 5040), the drawing component 4030 can draw the point on the GUI 6000 (e.g., the HTML canvas). The drawing component 4030 may be utilized after transforming points from three dimensional spatial coordinates to two dimensional pixel coordinates. Referring again to FIG. 11, the arcs AE and BF may have infinitely many points on them. Utilizing the information of the center of radii of these arcs from the transformation component 4020, the drawing component 4030 can utilize the equation of a circle to get a number of points on the arcs by incrementing z by a predefined constant value. The predefined value may be configurable, such as 10 pixels. While a lower value may increase precision, the lower value may also increase run time. In some implementations, to draw the arc through the points on the arc, the drawing component 4030 can utilize a spline interpolation algorithm.

Figure 14:
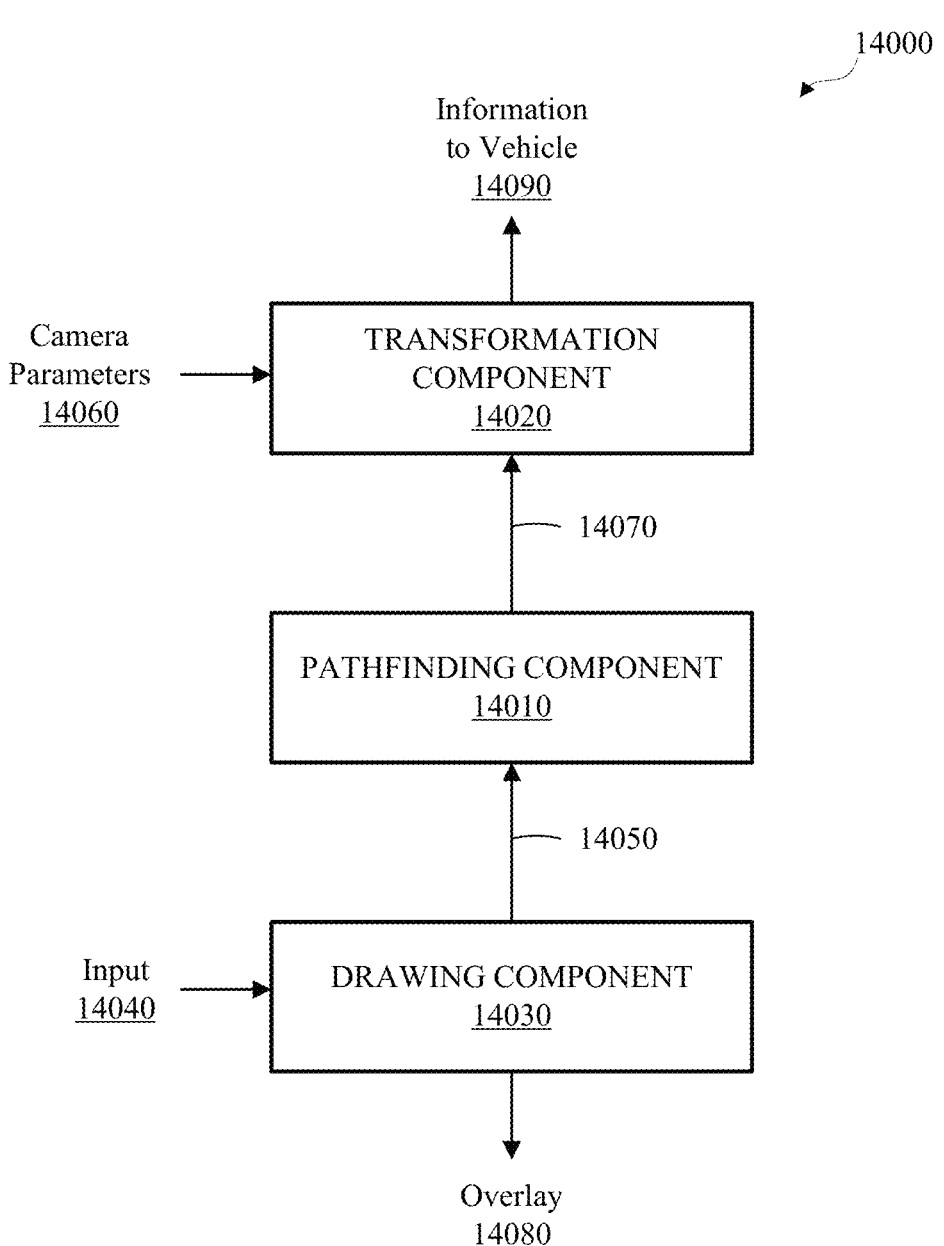
FIG. 14 is a block diagram of an example of another system for displaying an overlay including a projected path of a vehicle.

FIG. 14 is a block diagram of an example of a system 14000 for displaying an overlay 14080 including a projected path of a vehicle. For example, the system 14000 could be implemented by the controller apparatus 2410 of FIG. 2. In another example, the system 4000 could be implemented by computing devices or a server of the operations center 2400. The system 14000 could be used by a tele-operator to perform tele-operation of a vehicle, such as the tele-operators 3020/3030 performing tele-operation of the vehicle 3040/3050/3060/3070 of FIG. 3.

The system 14000 may include a pathfinding component 14010, a transformation component 14020, and a drawing component 14030. For example, the pathfinding component 14010, the transformation component 14020, and the drawing component 14030 could be the pathfinding component 4010, the transformation component 4020, and the drawing component 4030 of FIG. 4. The system 14000 can receive a video stream from a camera of a vehicle (e.g., the sensor 1360 of the vehicle 1050 of FIG. 1) in a transportation network (e.g., the vehicle 2100 in the transportation network 2200 of FIG. 2). For example, the camera could be configured as a front facing camera arranged on top of the vehicle. The system 14000 can also receive an input 14040 from a tele-operator. The input 14040 may indicate pixel coordinates in the video stream. The system 14000 can determine whether the pixel coordinates correspond to a location in the video stream that is valid to generate a projected path. If the location is valid, the drawing component 14030 can display the overlay 14080, including the projected path, in the video stream (e.g., in the GUI or HTML canvas) to include a visualization of the projected path. In some implementations, the drawing component 14030 can apply spline interpolation to display the overlay 14080. If the location is invalid, the drawing component 14030 can prevent display of the overlay 14080 based on the location being invalid.

Figure 15:
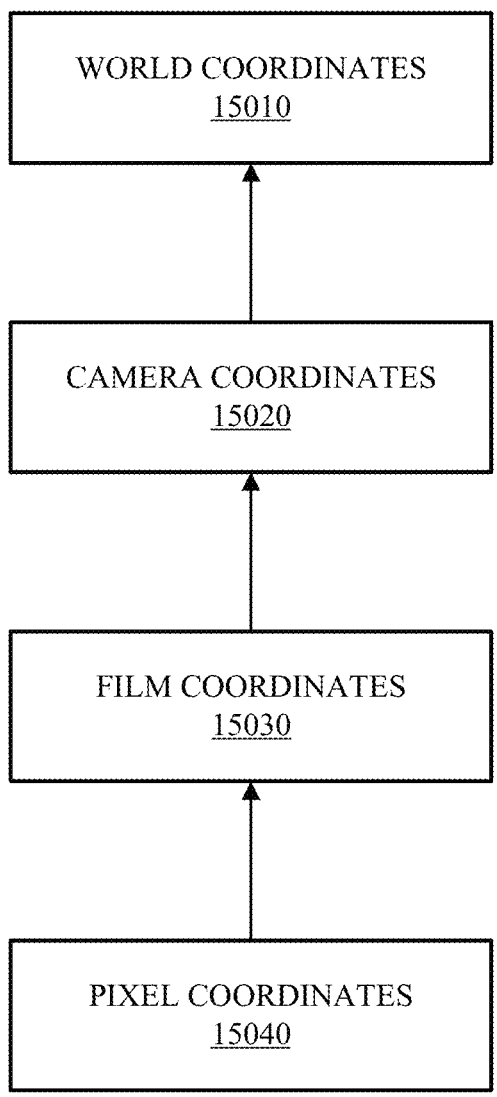
FIG. 15 is an example of transforming pixel coordinates to spatial coordinates.

If the overlay 14080 is displayed and acceptable, the tele-operator can select the overlay 14080 for transmission of corresponding information to the vehicle (e.g., the tele-operator clicking a button of the mouse). The drawing component 14030 can transmit an output 14050 to the pathfinding component 14010. With additional reference to FIG. 15, based on the selection of the overlay 14080, the pathfinding component 14010 can determine a projected path of the vehicle that includes pixel coordinates, such as pixel coordinates 15040. The pixel coordinates 15040 can correspond to coordinates of pixels in the GUI or HTML canvas that are selected (e.g., like the pixel coordinates 5040). The pathfinding component 14010 can transmit an output 14070 to the transformation component 14020. The transformation component 14020, in turn, can convert the pixel coordinates 15040 into film coordinates 15030. The film coordinates 15030 may correspond to coordinates in a focal plane of the camera (e.g., the video stream, like the film coordinates 5030). The transformation component 14020 can reference camera parameters 14060 that are intrinsic to the camera of the vehicle to determine the film coordinates 5030. For example, the camera parameters 14060 could indicate an orientation of the camera, such as the camera's height above ground, and/or a resolution of the camera. The transformation component 14020 can further convert the film coordinates 5030 into spatial coordinates. In some cases, the spatial coordinates determined by the transformation component 14020 may be camera coordinates 15020 (e.g., like the camera coordinates 5020). The transformation component 14020 can reference the camera parameters 14060 to convert the film coordinates 5030 into the camera coordinates 5020. In some cases, the spatial coordinates determined by the transformation component 14020 may be world coordinates 15010 (e.g., like the world coordinates 5010). The transformation component 14020 can convert the camera coordinates 5020 into the world coordinates 5010. The world coordinates 15010 may be coordinates relative to the transportation network (e.g., the transportation network 2200).

The transformation component 14020 can then transmit information 14090 to the vehicle based on a selection of the overlay 14080. The information may be configured to cause the vehicle to follow the projected path (e.g., the projected path determined by the pathfinding component 14010, based on the overlay 14080) according to the spatial coordinates. For example, the vehicle, utilizing its own sensors and safety modules, can determine to follow the path (or not follow the path) based on whether it is determined safe to do so.

Figure 16:
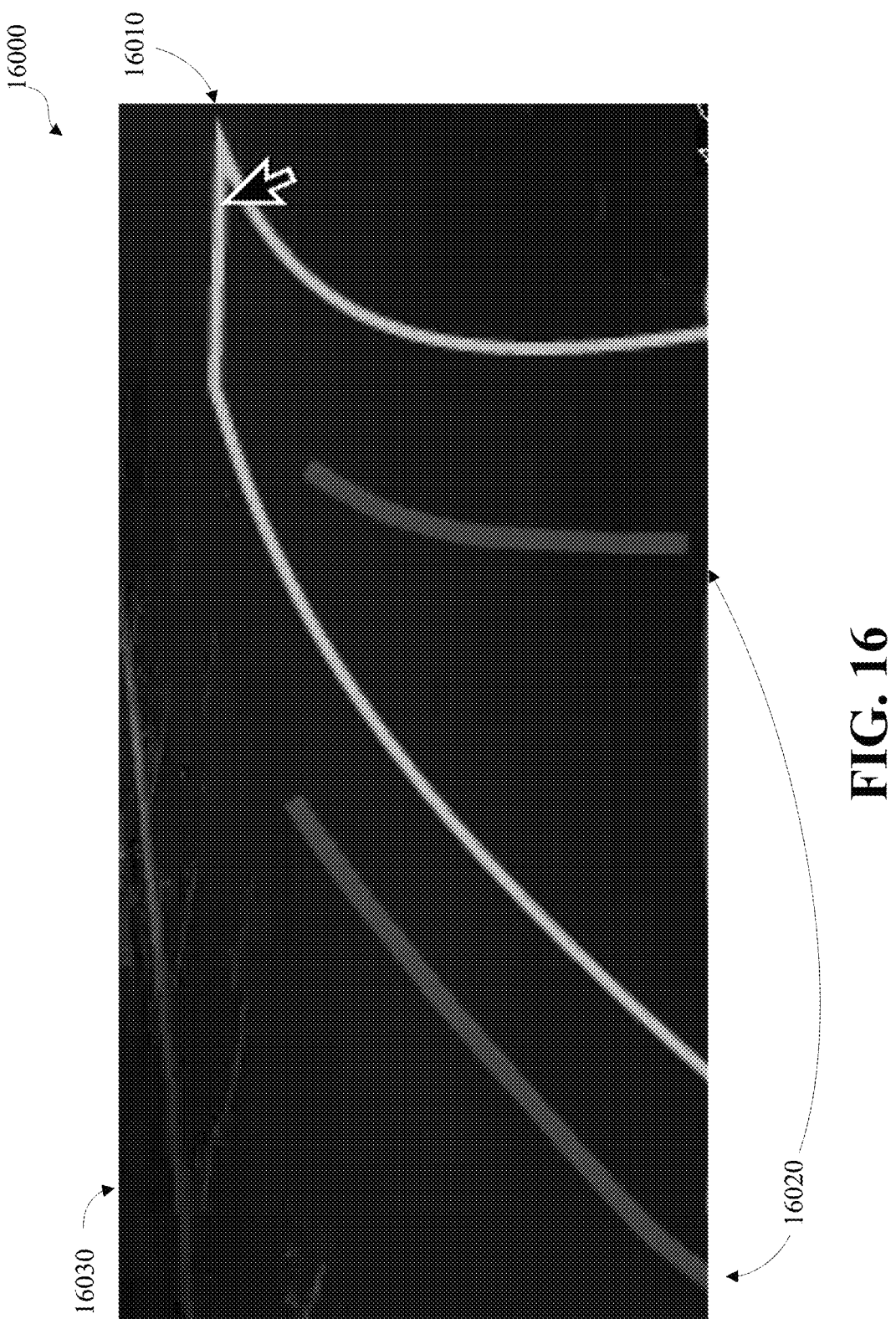
FIGS. 16-18 are examples of another GUI displaying an overlay including a projected path.
Figure 17:
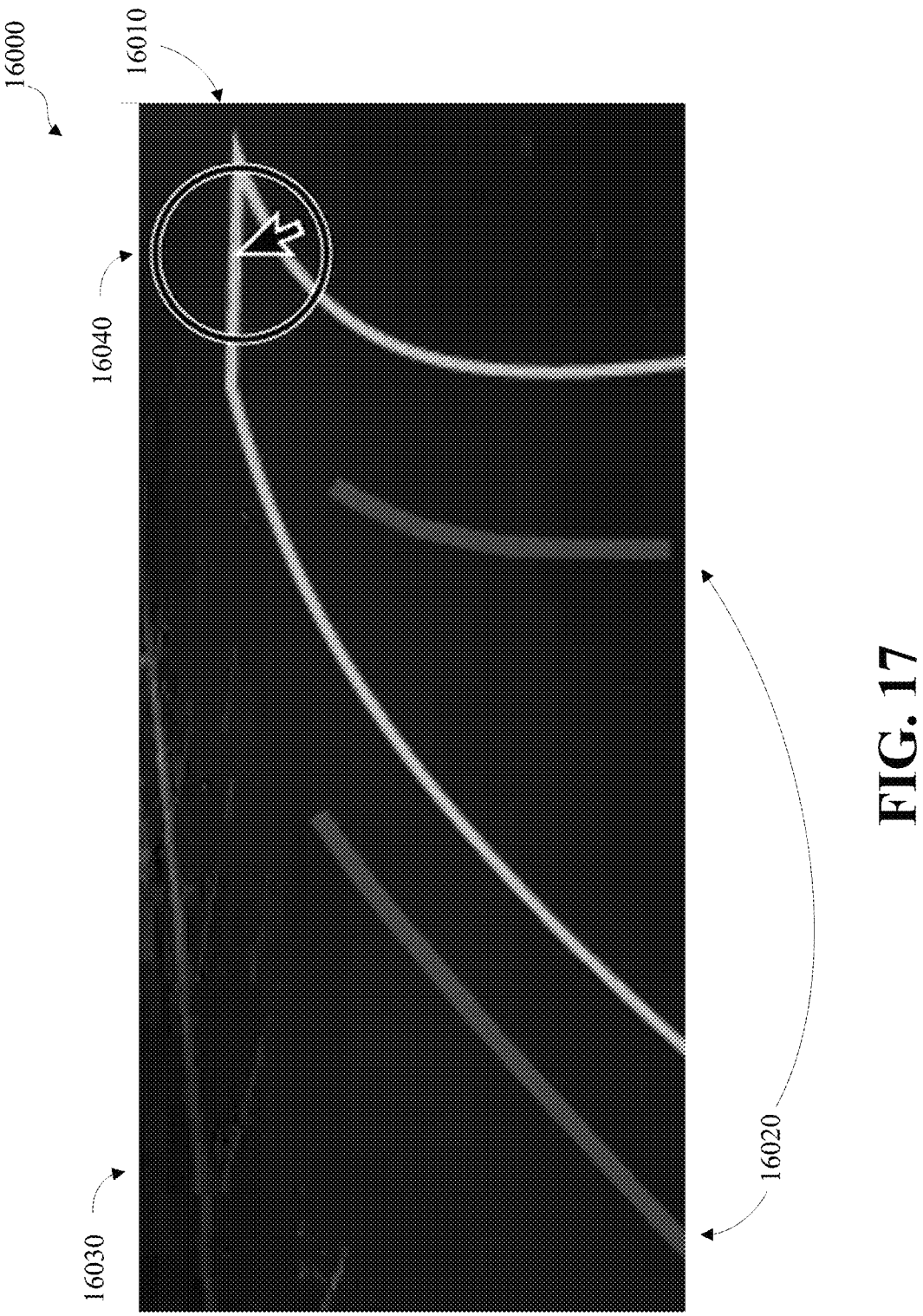
Figure 18:
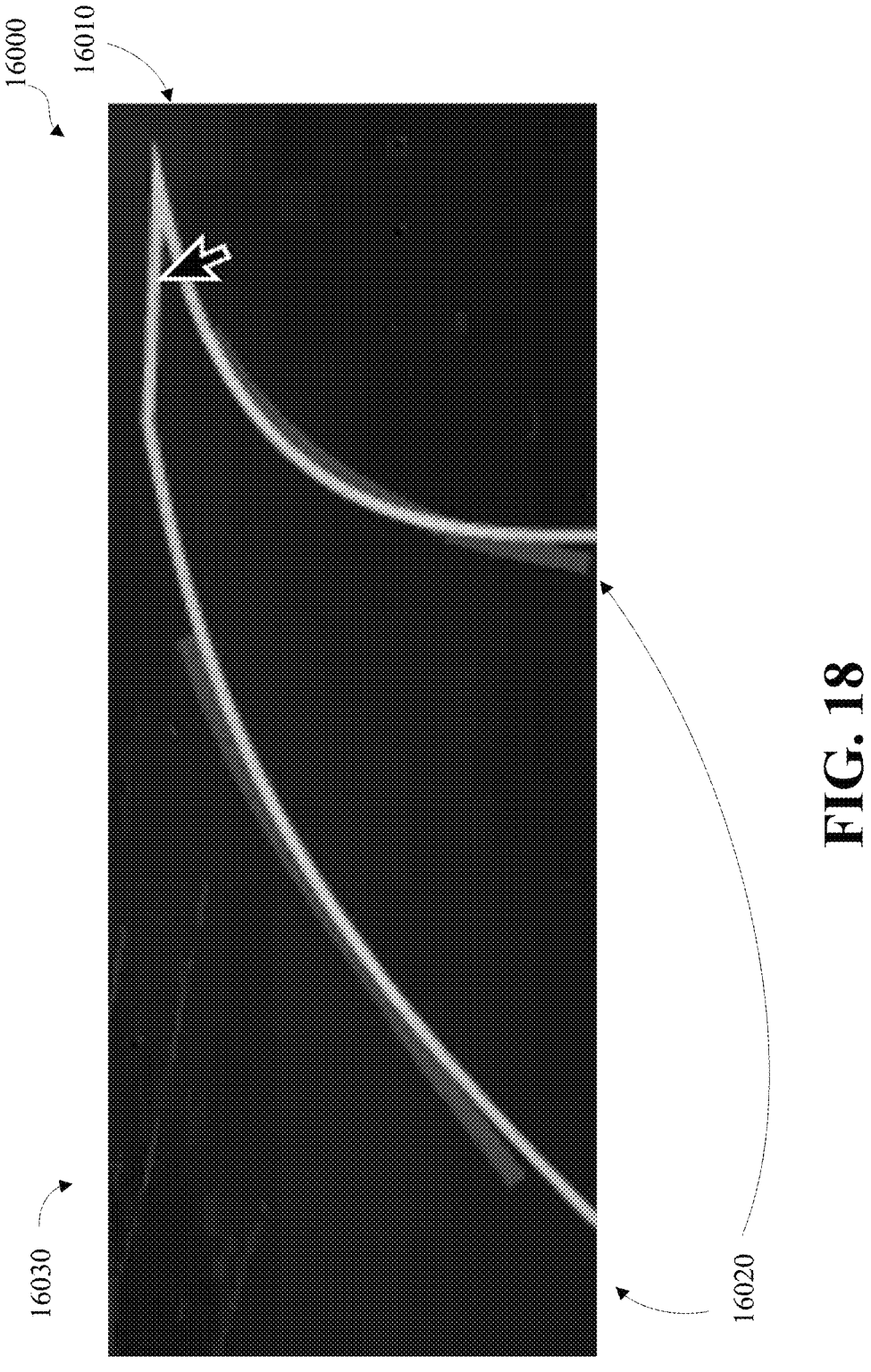

FIGS. 16-18 are examples of a GUI 16000 displaying an overlay 16010 including a projected path of a vehicle. The GUI 16000 could be used to assist a tele-operator to perform tele-operation of the vehicle, such as the tele-operators 3020/3030 performing tele-operation of the vehicle 3040/3050/3060/3070 of FIG. 3. For example, the system 14000 of FIG. 14 can generate the overlay 16010, corresponding to the overlay 14080. The GUI 16000 could comprise an HTML canvas or webpage displayed through a web interface.

The GUI 16000 may include a video stream 16030 from a camera of a vehicle in a transportation network (e.g., the vehicle 2100 in the transportation network 2200 of FIG. 2). For example, the video stream 16030 could correspond to a camera configured as a front facing camera arranged on top of the vehicle. In some implementations, the GUI 16000 may include additional video streams from additional cameras of the vehicle. The additional cameras may provide additional views for the tele-operator to further improve situational awareness. The GUI 16000 may also include a current path overlay 16020. The current path overlay 16020 may indicate a current path or trajectory of the vehicle in the video stream 16030 when the vehicle is in motion. The current path overlay 16020 may assist the tele-operator to understand the current path of the vehicle to improve situational awareness and decision making for selecting the a next path (e.g., the projected path).

Referring to FIG. 16, at a first time the system 14000 can receive input (e.g., the input 14040) through the GUI 16000. The input may indicate pixel coordinates in the video stream 16030, such as in the GUI 16000 or HTML canvas. The system 14000 can track the mouse movement in the GUI 16000. As the mouse moves, the system 14000 can update to determine if a path can be generated to the particular point of the mouse with a fixed curvature from a current position of the vehicle. If a path can be generated, then the system 14000 can generate the overlay 16010 representing the possible path. If a path cannot be generated, such as the mouse pointing to sky or to an area that the vehicle has already passed, then the system 14000 will not display the overlay 16010.

Referring to FIG. 17, at a second time the system 14000 can receive input (e.g., the input 14040) through the GUI 16000. The input may indicate a selection of the overlay 16010. For example, the tele-operator may click on a valid point in the video stream 16030 in the GUI 16000. In some cases, this may cause an indication 16040 of the selection, such as circling the mouse, or changing a color of the overlay 16010. This may cause a path to be generated, by the pathfinding component 14010, corresponding to the overlay 16010. This may also cause information to be transmitted by the transformation component 14020 to the vehicle (e.g., the information 14090).

Referring to FIG. 18, at a third time the video stream 16030 may reflect vehicle moving according to the projected path (e.g., based on the selection of the overlay 16010). As a result, the current path overlay 16020 may briefly correspond to the overlay 16010 (e.g., until the mouse is moved to select a new overlay, or the vehicle moves to a new position that differs from the overlay 16010). In this way, the tele-operator can continue to click in locations in the video stream, from one point to the next, to perform a tele-operation to guide the vehicle.

In some implementations, the system can predict a position of the vehicle in the video stream 16030 (e.g., like the position 6080). The position can be predicted based on a latency associated with the video stream 16030. For example, the system can predict an actual, real-time location of the vehicle in the video stream 16030 based on timing associated with receiving the video stream 16030 through the network. The system can include an indication of the position in the overlay 6010 on the video stream 16030. For example, the indication of the position could be color coded in the GUI 16000 depending on the latency that is predicted, such as green for lesser latency, yellow for moderate latency, and red for greater latency. This may enable the tele-operator to estimate where the vehicle is in the video stream 16030 at the moment the overlay 16010 is displayed. Further, the projected path in the overlay 16010 can start from a point in the overlay 16010 corresponding to the predicted position of the vehicle. For example, the point could represent an actual, real-time location of the front of vehicle. Changes in the projected path can be displayed starting from the point. As a result, the tele-operator can correctly visualize possible projected paths that the vehicle could perform (as opposed to projected paths that are no longer possible due to the vehicle having moved on).

Figure 19:
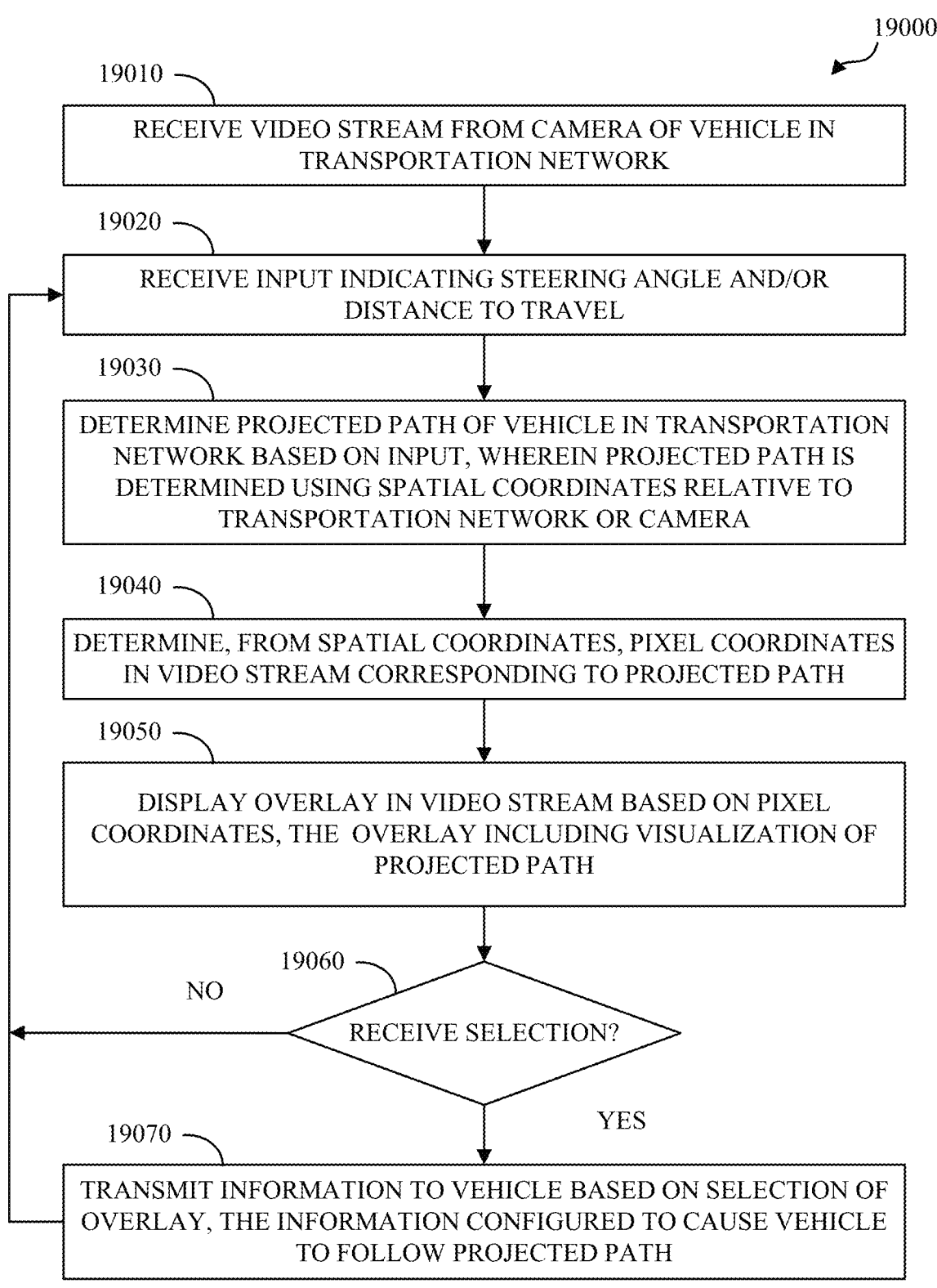
FIG. 19 is a flowchart of an example of a process for displaying an overlay including a projected path of a vehicle.

To further describe some implementations in greater detail, reference is next made to examples of techniques which may be performed by or using an overlay. FIG. 19 is a flowchart of an example of a process for displaying an overlay including a projected path of a vehicle. The process 19000 can be executed using computing devices, such as the systems, hardware, and software described with respect to FIGS. 1-18. The process 19000 can be performed, for example, by executing a machine-readable program or other computer-executable instructions, such as routines, instructions, programs, or other code. The steps, or operations, of the process 19000 or another technique, method, process, or algorithm described in connection with the implementations disclosed herein can be implemented directly in hardware, firmware, software executed by hardware, circuitry, or a combination thereof.

For simplicity of explanation, the process 19000 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 19010, a system can receive a video stream from a camera of a vehicle in a transportation network. For example, the system 4000 can receive the video stream 6030 from the camera 7010 of the vehicle 2100 in a transportation network 2200. The system can receive the video stream to enable tele-operation of the vehicle. For example, the system could be used by the tele-operators 3020/3030 to perform tele-operation of the vehicle 3040/3050/3060/3070.

At 19020, the system can receive an input indicating a steering angle and/or a distance to travel. The system input could be from a tele-operator via a GUI. For example, the GUI may include a steering area to configure the steering angle. The steering area could represent a virtual steering wheel, such as by depicting a portion of a wheel or an arc. The system can detect a mouse hovering over a position in the steering area in the GUI, which could correspondingly configure the steering angle. Configuring the steering angle, in turn, can cause the system to display an overlay in the video stream, including a visualization of the projected path. The overlay could be represented in the GUI by lines corresponding to a lane of travel. Further, configuring a different steering angle via the steering area can cause the overlay to correspondingly change in the video stream. In some implementations, the system can receive the input from a keyboard, joystick, game controller, steering wheel, pedal, or other device. The GUI can update to show a current input that is configured.

At 19030, the system can determine a projected path of the vehicle in the transportation network based on the input. The projected path may be determined using spatial coordinates relative to at least one of the transportation network or the camera. For example, the system can utilize the pathfinding component 4010 to determine the projected path. The pathfinding component 4010 can take the input, such as the steering angle and/or the distance to travel, and utilize the Ackermann model to determine a radius of a curve of the projected path. The pathfinding component can then utilize trigonometric and/or geometric calculations to determine three dimensional spatial coordinates of the projected path to generate a path output.

At 19040, the system can determine, from the spatial coordinates, pixel coordinates in the video stream corresponding to the projected path. For example, the system can utilize the transformation component 4020 to process the spatial coordinates from the path output. The transformation component 4020 can reference camera parameters that are intrinsic to the camera of the vehicle to determine the pixel coordinates. For example, the camera parameters could indicate an orientation of the camera, such as the camera's height above ground, and/or a resolution of the camera. The transformation component can convert the spatial coordinates into pixel coordinates, based on the camera parameters, to generate a transformation output.

At 19050, the system can display an overlay in the video stream based on the pixel coordinates. The overlay can include a visualization of the projected path. The overlay could be represented in the GUI by lines corresponding to a lane of travel. Further, configuring a different input can cause the overlay to correspondingly change in the video stream.

At 19060, the system can determine if a selection of the overlay is received. If a selection is not received ("No"), the process 19000 can return to step 19020 to receive input. If a selection is received ("Yes"), the process 19000 can continue to step 19070. At 19070, the system can transmit information to the vehicle based on the selection of the overlay. The information may be configured to cause the vehicle to follow the projected path according to the spatial coordinates. For example, a vehicle, utilizing its own sensors and safety modules, can determine to follow the projected path (or not follow the projected path) based on whether the vehicle determines the projected path is safe to follow (e.g., clear of obstacles).

Figure 20:
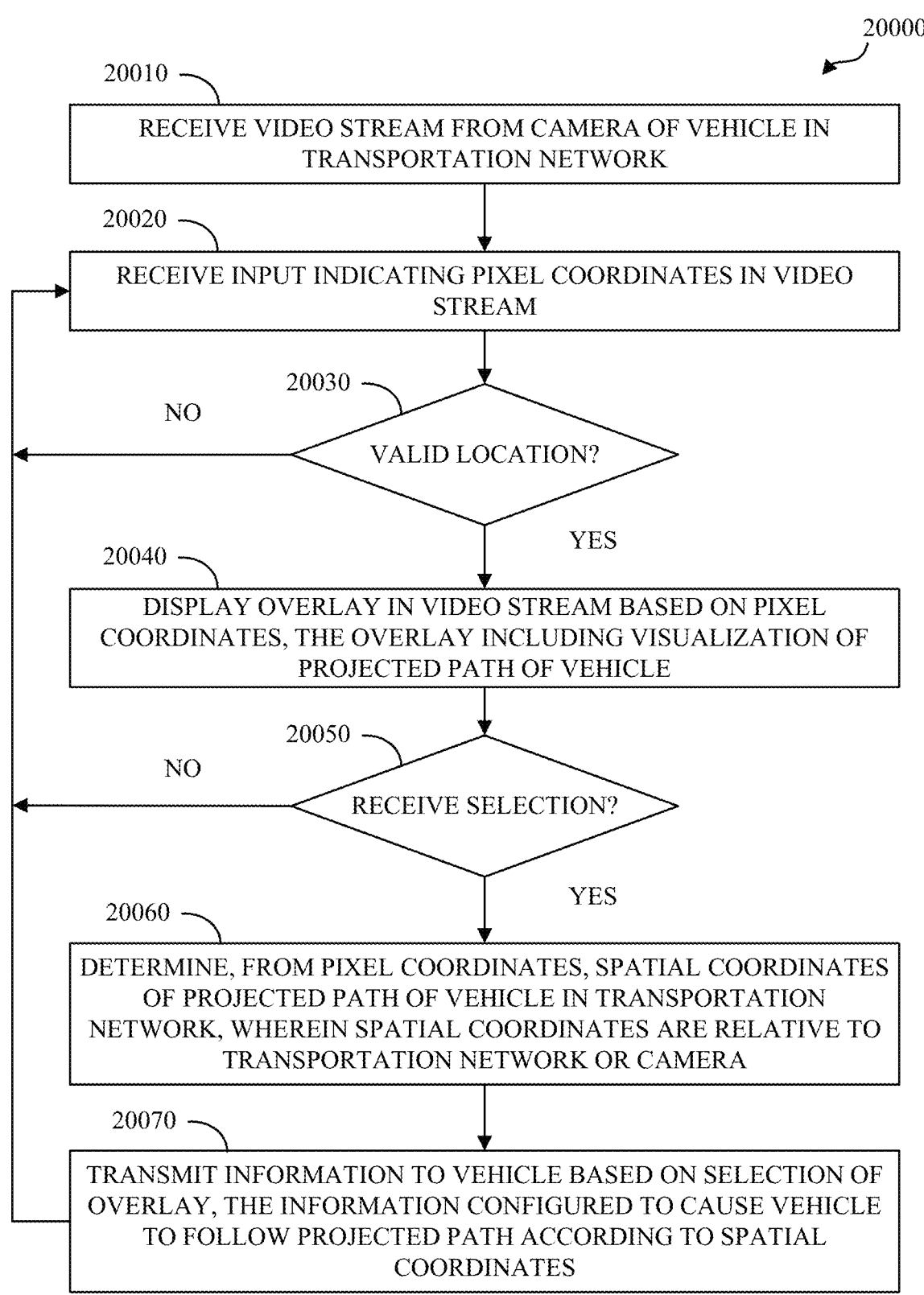
FIG. 20 is a flowchart of an example of another process for displaying an overlay including a projected path of a vehicle.

FIG. 20 is a flowchart of an example of another process for displaying an overlay including a projected path of a vehicle. The process 20000 can be executed using computing devices, such as the systems, hardware, and software described with respect to FIGS. 1-18. The process 20000 can be performed, for example, by executing a machine-readable program or other computer-executable instructions, such as routines, instructions, programs, or other code. The steps, or operations, of the process 20000 or another technique, method, process, or algorithm described in connection with the implementations disclosed herein can be implemented directly in hardware, firmware, software executed by hardware, circuitry, or a combination thereof.

For simplicity of explanation, the process 20000 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 20010, a system (e.g., the system 14000) can receive a video stream from a camera of a vehicle in a transportation network. For example, the system 14000 can receive the video stream 16030 from the camera 7010 of the vehicle 2100 in a transportation network 2200. The system can receive the video stream to enable tele-operation of the vehicle. For example, the system could be used by the tele-operators 3020/3030 to perform tele-operation of the vehicle 3040/3050/3060/3070.

At 20020, the system can receive an input indicating pixel coordinates in the video stream. The input 14040 may indicate a location in the video stream. In some cases, the system can track mouse movement and clicks in the GUI. For example, a tele-operator can use the mouse to point to locations in the video stream. As the mouse is moved in the GUI, the system can determine if a path can be generated to that particular point in the video stream with a fixed curvature from a current position of the vehicle. In some implementations, other devices may be used to point to a location in the video stream.

At 20030, the system can determine, before displaying the overlay, that the pixel coordinates correspond to a location in the video stream that is valid to generate the projected path. If the pixel coordinates do not correspond to a location that is valid ("No"), the process 20000 can return to step 20030 to receive input. If the pixel coordinates do correspond to a location that is valid ("Yes"), the process 20000 can continue to step 20040. At 20040, the system can display an overlay in the video stream based on the pixel coordinates. The overlay can include a visualization of a projected path of the vehicle. In some implementations, the drawing component 14030 can display the overlay, including the projected path, in the video stream.

At 20050, the system can determine if a selection of the overlay is received. If a selection is not received ("No"), the process 20000 can return to step 20030 to receive input. If a selection is received ("Yes"), the process 20000 can continue to step 20060. At 20060, the system can determine, from the pixel coordinates, spatial coordinates of the projected path of the vehicle in the transportation network. The spatial coordinates may be relative to the transportation network or the camera. In some implementations, the pathfinding component 14010 can determine the projected path of the vehicle that includes pixel coordinates. The pathfinding component can transmit an output to the transformation component 14020. The transformation component, in turn, can convert the pixel coordinates into the spatial coordinates (e.g., into film coordinates, then camera coordinates, then world coordinates).

At 20070, the system can transmit information to the vehicle based on the selection of the overlay. The information may be configured to cause the vehicle to follow the projected path according to the spatial coordinates. For example, a vehicle, utilizing its own sensors and safety modules, can determine to follow the projected path (or not follow the projected path) based on whether the vehicle determines the projected path is safe to follow (e.g., clear of obstacles).

As used herein, the terminology "example", "embodiment", "implementation", "aspect", "feature", or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A method, comprising:
   receiving, at a remote system, a video stream from a camera of a vehicle in a transportation network, wherein the remote system is external from the vehicle;

receiving, at the remote system, an input indicating at least one of a steering angle or a distance to travel;

determining, at the remote system, a projected path of the vehicle in the transportation network based on the input, wherein the projected path is determined using spatial coordinates relative to at least one of the transportation network or the camera;

determining, at the remote system from the spatial coordinates and camera parameters associated with the camera, pixel coordinates in the video stream corresponding to the projected path;

determining, at the remote system, a predicted position of the vehicle in the video stream based on a latency associated with the video stream; and displaying, at the remote system, an overlay in the video stream based on the pixel coordinates, the overlay including a visualization of the projected path starting from the predicted position.

2. The method of claim 1, further comprising:

receiving, at the remote system, a selection of the overlay; and transmitting, by the remote system, information to the vehicle based on the selection, the information configured to cause the vehicle to follow the projected path.

3. The method of claim 1, wherein the camera parameters comprise an orientation of the camera and a resolution of the camera.

4. The method of claim 1, wherein the overlay further includes an indication of the latency, and wherein the indication is color coded with a first color for lesser latency, a second color for moderate latency, or a third color for greater latency.

5. The method of claim 1, wherein the overlay is represented by lines corresponding to a lane of travel.

6. The method of claim 1, wherein the input is received through a graphical user interface (GUI) by a detecting a mouse hovering over an area in the GUI to configure the steering angle, and wherein a selection of the overlay is received by detecting clicking of a button of the mouse.

7. The method of claim 1, wherein determining the projected path includes applying Ackermann steering geometry to determine a radius of the projected path.

8. The method of claim 1, wherein displaying the overlay includes applying spline interpolation based on the pixel coordinates.

9. An apparatus, comprising:

a memory; and a processor located at a remote system configured to execute instructions stored in the memory to:

receive a video stream from a camera of a vehicle in a transportation network, wherein the remote system is external from the vehicle;

receive an input indicating a steering angle and a distance to travel;

determine a projected path of the vehicle in the transportation network based on the steering angle and the distance to travel, wherein the projected path is determined using three dimensional spatial coordinates relative to the transportation network;

determine, from the three dimensional spatial coordinates and camera parameters associated with the camera, two dimensional pixel coordinates in the video stream corresponding to the projected path;

determine a predicted position of the vehicle in the video stream based on a latency associated with the video stream; and display an overlay in the video stream based on the two dimensional pixel coordinates, the overlay including a visualization of the projected path starting from the predicted position.

10. The apparatus of claim 9, wherein the processor is further configured to execute instructions stored in the memory to:

receive a selection of the overlay; and transmit information to the vehicle based on the selection, the information configured to cause the vehicle to follow the projected path.

11. The apparatus of claim 9, wherein the camera parameters comprise an orientation of the camera and a resolution of the camera.

12. The apparatus of claim 9, wherein the overlay further includes an indication of the latency, and wherein the indication is color coded with a first color for lesser latency, a second color for moderate latency, or a third color for greater latency.

13. The apparatus of claim 9, wherein the overlay is represented by lines corresponding to a lane of travel.

14. The apparatus of claim 9, wherein the input is received through a graphical user interface (GUI) by a detecting a mouse hovering over an area in the GUI to configure a steering angle and by detecting a wheel of the mouse that is scrolling to configure the distance, and wherein a selection of the overlay is received by detecting clicking of a button of the mouse.

15. A non-transitory computer readable medium storing instructions operable to cause one or more processors to perform operations comprising:

receiving, at a remote system, a video stream from a camera implemented by a vehicle in a transportation network, wherein the remote system is external from the vehicle;

receiving, at the remote system, an input indicating at least one of a steering angle or a distance to travel;

determining, at the remote system, a projected path of the vehicle in the transportation network based on the input, wherein the projected path is determined using spatial coordinates relative to the camera;

determining, at the remote system from the spatial coordinates and camera parameters associated with the camera, pixel coordinates in the video stream corresponding to the projected path;

determining, at the remote system, a predicted position of the vehicle in the video stream based on a latency associated with the video stream; and displaying, at the remote system, an overlay in the video stream based on the pixel coordinates, the overlay including a visualization of the projected path starting from the predicted position.

16. The non-transitory computer readable medium storing instructions of claim 15, the operations further comprising:

receiving, at the remote system, a second input indicating a selection of the overlay; and transmitting, by the remote system, information to the vehicle based on the second input, the information configured to cause the vehicle to follow the projected path.

17. The non-transitory computer readable medium storing instructions of claim 15, wherein the camera parameters comprise an orientation of the camera and a resolution of the camera.

18. The non-transitory computer readable medium storing instructions of claim 15, wherein the overlay further includes an indication of the latency, and wherein the indication is color coded with a first color for lesser latency, a second color for moderate latency, or a third color for greater latency.

19. The non-transitory computer readable medium storing instructions of claim 15, wherein the overlay is represented by lines corresponding to a lane of travel.

20. The non-transitory computer readable medium storing instructions of claim 15, wherein the input is received through a graphical user interface (GUI) by a detecting a mouse hovering over a portion of a wheel in the GUI to configure the steering angle and by detecting a position of a slider in the GUI to configure the distance, and wherein a selection of the overlay is received by detecting clicking of a button of at least one of the mouse or a keyboard.

\* \* \* \* \*